US012757270B2

(12) United States Patent
Abedini et al.

(10) Patent No.: US 12,757,270 B2
(45) Date of Patent: Oct. 6, 2026

(54) EFFICIENT SIMULTANEOUS COMMUNICATION OF A DUAL-CONNECTED WIRELESS NODE

(71) Applicant: QUALCOMM Incorporated, San Diego, CA (US)

(72) Inventors: Navid Abedini, Basking Ridge, NJ (US); Jianghong Luo, Skillman, NJ (US); Luca Blessent, Whitehouse Station, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 549 days.

(21) Appl. No.: 17/932,103

(22) Filed: Sep. 14, 2022

(65) Prior Publication Data

US 2023/0104732 A1 Apr. 6, 2023

Related U.S. Application Data

(60) Provisional application No. 63/261,983, filed on Oct. 1, 2021.

(51) Int. Cl.
*H04W 76/15* (2018.01)
*H04W 72/1263* (2023.01)

(52) U.S. Cl.
CPC ....... *H04W 76/15* (2018.02); *H04W 72/1263* (2013.01)

(58) Field of Classification Search
CPC ............. H04W 76/15; H04W 72/1263; H04W 88/085; H04B 7/0695
USPC .......................................................... 370/329
See application file for complete search history.

(56) References Cited

U.S. PATENT DOCUMENTS

| | | | | |
|---|---|---|---|---|
| 11,569,883 | B2 * | 1/2023 | Cha | H04B 7/088 |
| 12,143,998 | B2 * | 11/2024 | Park | H04L 5/0053 |
| 2021/0195541 | A1 | 6/2021 | Wei et al. | |
| 2023/0126621 | A1 * | 4/2023 | You | H04W 72/044 |
| 2023/0292204 | A1 * | 9/2023 | Mildh | H04W 36/18 |
| 2023/0362727 | A1 * | 11/2023 | Yuan | H04B 7/15528 |
| 2025/0063573 | A1 * | 2/2025 | Park | H04L 5/0053 |

FOREIGN PATENT DOCUMENTS

WO WO-2022151404 A1 * 7/2022 ......... H04B 7/15528

OTHER PUBLICATIONS

3rd Generation Partnership Project; Technical Specification Group Radio Access Network; NR; NR and NG-RAN Overall Description 3GPP TS 38.300 V16.5.0 (Mar. 2021) (Year: 2021).*

(Continued)

*Primary Examiner* — Christopher M Crutchfield
*Assistant Examiner* — Syed Ahmed
(74) *Attorney, Agent, or Firm* — Harrity & Harrity, LLP

(57) ABSTRACT

Various aspects of the present disclosure generally relate to wireless communication. In some aspects, a wireless node may transmit, to at least one of a first parent node or a second parent node, assistance information relating to simultaneous communication of the wireless node with the first parent node and the second parent node. The wireless node may communicate with at least one of the first parent node or the second parent node based at least in part on the assistance information. Numerous other aspects are described.

30 Claims, 13 Drawing Sheets

(56) References Cited

OTHER PUBLICATIONS

3rd Generation Partnership Project; Technical Specification Group Radio Access Network; NR• Study on Integrated Access and Backhaul; 3GPP TR 38.87 4 V16.0.0 (Dec. 2018) (Year: 2018).*

Sunay, O., et al. "ONF's software-defined RAN platform consistent with the O-RAN architecture." ONF White Paper. 2020. (Year: 2020).*

Ericsson: "Resource Multiplexing and Dual Connectivity in Enhanced IAB", 3GPP TSG-RAN WG1 Meeting #106-e, R1-2108107, 3rd Generation Partnership Project, Mobile Competence Centre, 650, Route Des Lucioles, F-06921 Sophia-Antipolis Cedex, France, vol. RAN WG1, No. Online, Aug. 16, 2021-Aug. 27, 2021, Aug. 6, 2021, 21 Pages, XP052033778, paragraph [02.1], paragraph [02.2].

International Search Report and Written Opinion—PCT/US2022/076583—ISA/EPO—Dec. 21, 2022.

Nokia, et al., "Other Enhancements for Simultaneous Operation of IAB-Node's Child and Parent Links", 3GPP TSG RAN WG1 #106-e, R1-2106829, 3rd Generation Partnership Project, Mobile Competence Centre, 650, Route Des Lucioles, F-06921 Sophia-Antipolis Cedex, France, vol. RAN WG1, No. e-Meeting, Aug. 16, 2021-Aug. 27, 2021, Aug. 6, 2021, 14 Pages, XP052033275, Paragraph [0002].

Vivo: "Enhancement to Resource Multiplexing Between Child and Parent Links", 3GPP TSG RAN WG1 #106-e, R1-2106617, 3rd Generation Partnership Project, Mobile Competence Centre, 650, Route Des Lucioles, F-06921 Sophia-Antipolis Cedex, France, vol. RAN WG1, No. e-Meeting, Aug. 16, 2021-Aug. 27, 2021, 9 Pages, Aug. 7, 2021, XP052037923, figure , p. 1, line 13-line 14.

* cited by examiner

EFFICIENT SIMULTANEOUS COMMUNICATION OF A DUAL-CONNECTED WIRELESS NODE

CROSS-REFERENCE TO RELATED APPLICATION

This patent application claims priority to U.S. Provisional Patent Application No. 63/261,983, filed on Oct. 1, 2021, entitled "EFFICIENT SIMULTANEOUS COMMUNICATION OF A DUAL-CONNECTED WIRELESS NODE," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for efficient simultaneous communication of a dual connected wireless node.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a wireless node for wireless communication. The wireless node may include a memory and one or more processors coupled to the memory. The one or more processors may be configured to transmit, to at least one of a first parent node or a second parent node, assistance information relating to simultaneous communication of the wireless node with the first parent node and the second parent node. The one or more processors may be configured to communicate with at least one of the first parent node or the second parent node based at least in part on the assistance information.

Some aspects described herein relate to a first parent node for wireless communication. The first parent node may include a memory and one or more processors coupled to the memory. The one or more processors may be configured to receive assistance information relating to simultaneous communication of a wireless node with the first parent node and a second parent node. The one or more processors may be configured to communicate with the wireless node based at least in part on the assistance information.

Some aspects described herein relate to a first parent node for wireless communication. The first parent node may include a memory and one or more processors coupled to the memory. The one or more processors may be configured to transmit, to at least one of a second parent node, a central unit, or a wireless node, assistance information relating to simultaneous communication of the wireless node with the first parent node and the second parent node. The one or more processors may be configured to communicate with the wireless node based at least in part on the assistance information.

Some aspects described herein relate to a method of wireless communication performed by a wireless node. The method may include transmitting, to at least one of a first parent node or a second parent node, assistance information relating to simultaneous communication of the wireless node with the first parent node and the second parent node. The method may include communicating with at least one of the first parent node or the second parent node based at least in part on the assistance information.

Some aspects described herein relate to a method of wireless communication performed by a first parent node. The method may include receiving assistance information relating to simultaneous communication of a wireless node with the first parent node and a second parent node. The method may include communicating with the wireless node based at least in part on the assistance information.

Some aspects described herein relate to a method of wireless communication performed by a first parent node. The method may include transmitting, to at least one of a second parent node, a central unit, or a wireless node, assistance information relating to simultaneous communication of the wireless node with the first parent node and the second parent node. The method may include communicating with the wireless node based at least in part on the assistance information.

Some aspects described herein relate to a non-transitory computer-readable medium that stores a set of instructions for wireless communication by a wireless node. The set of instructions, when executed by one or more processors of the wireless node, may cause the wireless node to transmit, to at least one of a first parent node or a second parent node, assistance information relating to simultaneous communication of the wireless node with the first parent node and the second parent node. The set of instructions, when executed by one or more processors of the wireless node, may cause the wireless node to communicate with at least one of the first parent node or the second parent node based at least in part on the assistance information.

Some aspects described herein relate to a non-transitory computer-readable medium that stores a set of instructions for wireless communication by a first parent node. The set of instructions, when executed by one or more processors of the first parent node, may cause the first parent node to receive assistance information relating to simultaneous communication of a wireless node with the first parent node and a second parent node. The set of instructions, when executed by one or more processors of the first parent node, may cause the first parent node to communicate with the wireless node based at least in part on the assistance information.

Some aspects described herein relate to a non-transitory computer-readable medium that stores a set of instructions for wireless communication by a first parent node. The set of instructions, when executed by one or more processors of the first parent node, may cause the first parent node to transmit, to at least one of a second parent node, a central unit, or a wireless node, assistance information relating to simultaneous communication of the wireless node with the first parent node and the second parent node. The set of instructions, when executed by one or more processors of the first parent node, may cause the first parent node to communicate with the wireless node based at least in part on the assistance information.

Some aspects described herein relate to an apparatus for wireless communication. The apparatus may include means for transmitting, to at least one of a first parent node or a second parent node, assistance information relating to simultaneous communication with the first parent node and the second parent node. The apparatus may include means for communicating with at least one of the first parent node or the second parent node based at least in part on the assistance information.

Some aspects described herein relate to an apparatus for wireless communication. The apparatus may include means for receiving assistance information relating to simultaneous communication of a wireless node with the apparatus and a second parent node. The apparatus may include means for communicating with the wireless node based at least in part on the assistance information.

Some aspects described herein relate to an apparatus for wireless communication. The apparatus may include means for transmitting, to at least one of a second parent node, a central unit, or a wireless node, assistance information relating to simultaneous communication of the wireless node with the apparatus and the second parent node. The apparatus may include means for communicating with the wireless node based at least in part on the assistance information.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
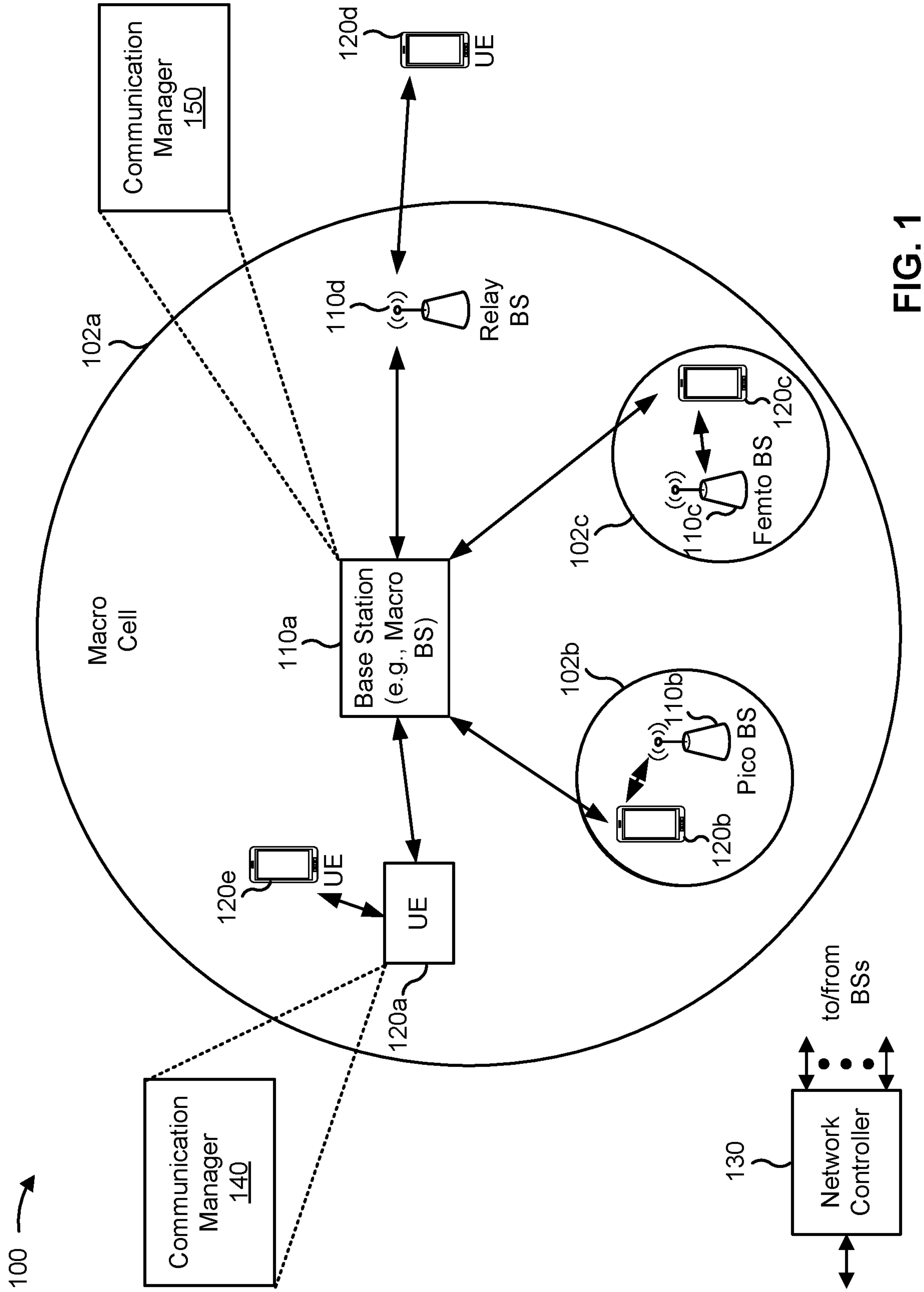
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110*a*, a BS 110*b*, a BS 110*c*, and a BS 110*d*), a user equipment (UE) 120 or multiple UEs 120 (shown as a UE 120*a*, a UE 120*b*, a UE 120*c*, a UE 120*d*, and a UE 120*e*), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110*a* may be a macro base station for a macro cell 102*a*, the BS 110*b* may be a pico base station for a pico cell 102*b*, and the BS 110*c* may be a femto base station for a femto cell 102*c*. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110*d* (e.g., a relay base station) may communicate with the BS 110*a* (e.g., a macro base station) and the UE 120*d* in order to facilitate communication between the BS 110*a* and the UE 120*d*. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may transmit, to at least one of a first parent node or a second parent node, assistance information relating to simultaneous communication with the first parent node and the second parent node; and communicate with at least one of the first parent node or the second parent node based at least in part on the assistance information. Additionally, or alternatively, the communication manager 140 may perform one or more other operations described herein.

In some aspects, the base station 110 may include a communication manager 150. In some aspects, as described in more detail elsewhere herein, the communication manager 150 of a base station 110, such as a relay base station (e.g., BS 110*d*), may transmit, to at least one of a first parent node or a second parent node, assistance information relating to simultaneous communication with the first parent node and the second parent node; and communicate with at least one of the first parent node or the second parent node based at least in part on the assistance information. Additionally, or alternatively, the communication manager 150 may perform one or more other operations described herein.

In some aspects, as described in more detail elsewhere herein, a base station 110 may be a first parent node of a wireless node (e.g., a UE or a relay base station) that is dual-connected to the first parent node and a second parent node, and the communication manager 150 of the base station 110 may receive assistance information relating to simultaneous communication of the wireless node with the first parent node and a second parent node; and communicate with the wireless node based at least in part on the assistance information. Additionally, or alternatively, the communication manager 150 may perform one or more other operations described herein.

In some aspects, as described in more detail elsewhere herein, a base station 110 may be a first parent node of a wireless node (e.g., a UE or a relay base station) that is dual-connected to the first parent node and a second parent node, and the communication manager 150 of the base station 110 may transmit, to at least one of the second parent node, a central unit, or a wireless node, assistance information relating to simultaneous communication of the wireless node with the first parent node and the second parent node; and communicate with the wireless node based at least in part on the assistance information. Additionally, or alternatively, the communication manager 150 may perform one or more other operations described herein.

As indicated above, FIG. 1 is provided as an example. Other examples may differ from what is described with regard to FIG. 1.

Figure 2:
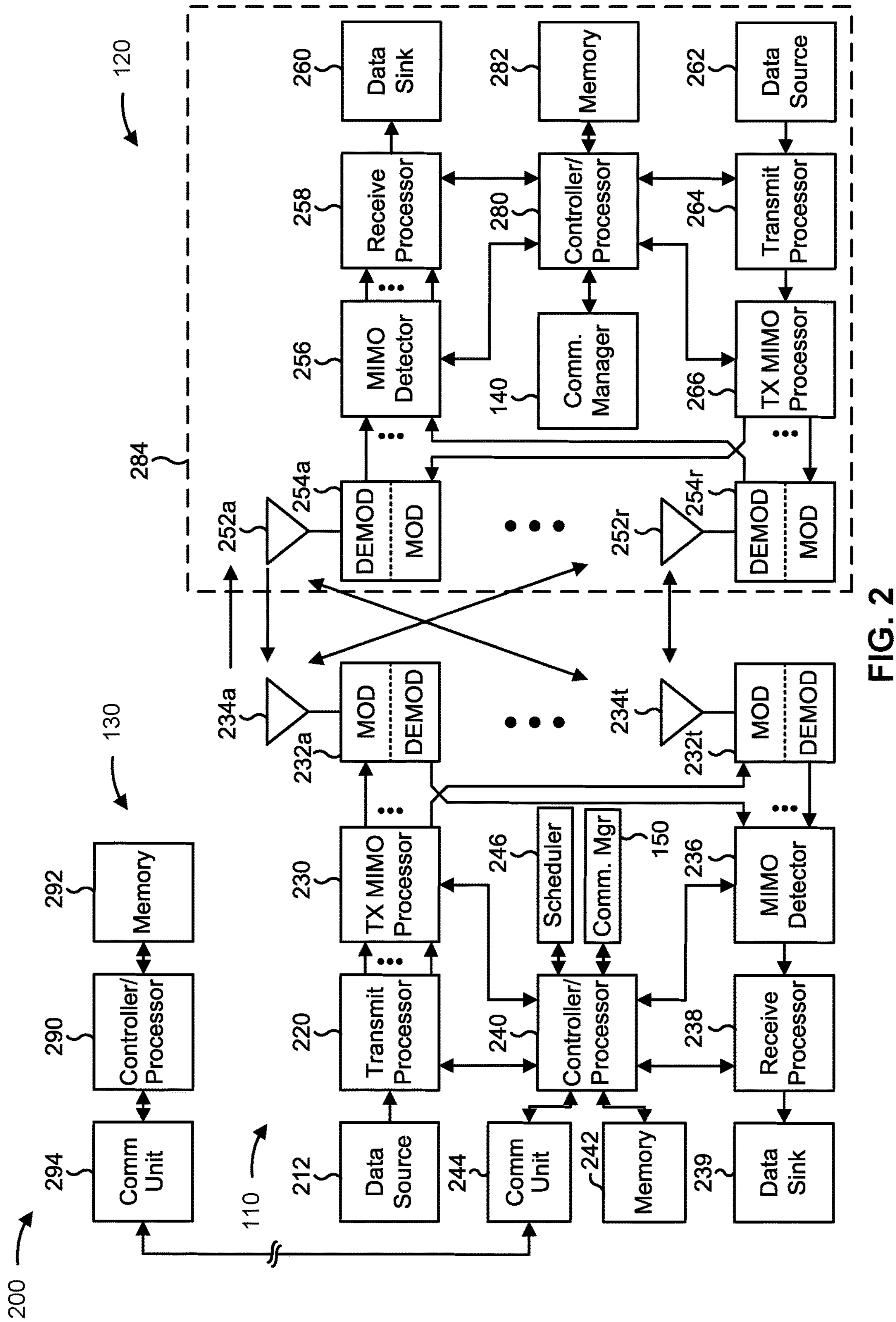
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234*a* through 234*t*, such as T antennas (T≥1). The UE 120 may be equipped with a set of antennas 252*a* through 252*r*, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232*a* through 232*t*. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232*a* through 232*t* may transmit a set of downlink signals (e.g., T downlink signals) via a corresponding set of antennas 234 (e.g., T antennas), shown as antennas 234*a* through 234*t*.

At the UE 120, a set of antennas 252 (shown as antennas 252*a* through 252*r*) may receive the downlink signals from the base station 110 and/or other base stations 110 and may provide a set of received signals (e.g., R received signals) to a set of modems 254 (e.g., R modems), shown as modems 254*a* through 254*r*. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234*a* through 234*t* and/or antennas 252*a* through 252*r*) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 7-13).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 7-13).

The controller/processor 240 of the base station 110, the controller/processor 280 of the UE 120, and/or any other component(s) of FIG. 2 may perform one or more techniques associated with efficient simultaneous communication of a dual-connected wireless node, as described in more detail elsewhere herein. For example, the controller/processor 240 of the base station 110, the controller/processor 280 of the UE 120, and/or any other component(s) of FIG. 2 may perform or direct operations of, for example, process 900 of FIG. 9, process 1000 of FIG. 10, process 1100 of FIG. 11, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 900 of FIG. 9, process 1000 of FIG. 10, process 1100 of FIG. 11, and/or other processes as described herein. In some examples, executing instructions may include running the instructions, converting the instructions, compiling the instructions, and/or interpreting the instructions, among other examples. In some aspects, the wireless node described herein is the base station 110, is included in the base station 110, or includes one or more components of the base station 110 shown in FIG. 2. In some aspects, the wireless node described herein is the UE 120, is included in the UE 120, or includes one or more components of the UE 120 shown in FIG. 2. In some aspects, the parent node described herein is the base station 110, is included in the base station 110, or includes one or more components of the base station 110 shown in FIG. 2.

In some aspects, the wireless node includes means for transmitting, to at least one of a first parent node or a second parent node, assistance information relating to simultaneous communication of the wireless node with the first parent node and the second parent node; and/or means for communicating with at least one of the first parent node or the second parent node based at least in part on the assistance information. In some aspects, the means for the wireless node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246. In some aspects, the means for the wireless node to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a first parent node includes means for receiving assistance information relating to simultaneous communication of a wireless node with the first parent node and a second parent node; and/or means for communicating with the wireless node based at least in part on the assistance information. In some aspects, the means for the first parent node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, a first parent node includes means for transmitting, to at least one of a second parent node, a central unit, or a wireless node, assistance information relating to simultaneous communication of the wireless node with the first parent node and the second parent node; and/or means for communicating with the wireless node based at least in part on the assistance information. In some aspects, the means for the first parent node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, a base station, or a network equipment may be implemented in an aggregated or disaggregated architecture. For example, a base station (such as a Node B (NB), an evolved NB (eNB), an NR BS, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to an aggregated base station, a disaggregated base station, or to one or more units of a disaggregated base station (such as one or more central units (CUs), one or more distributed units (DUs), one or more radio units (RUs), or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more DUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an integrated access and backhaul (IAB) network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
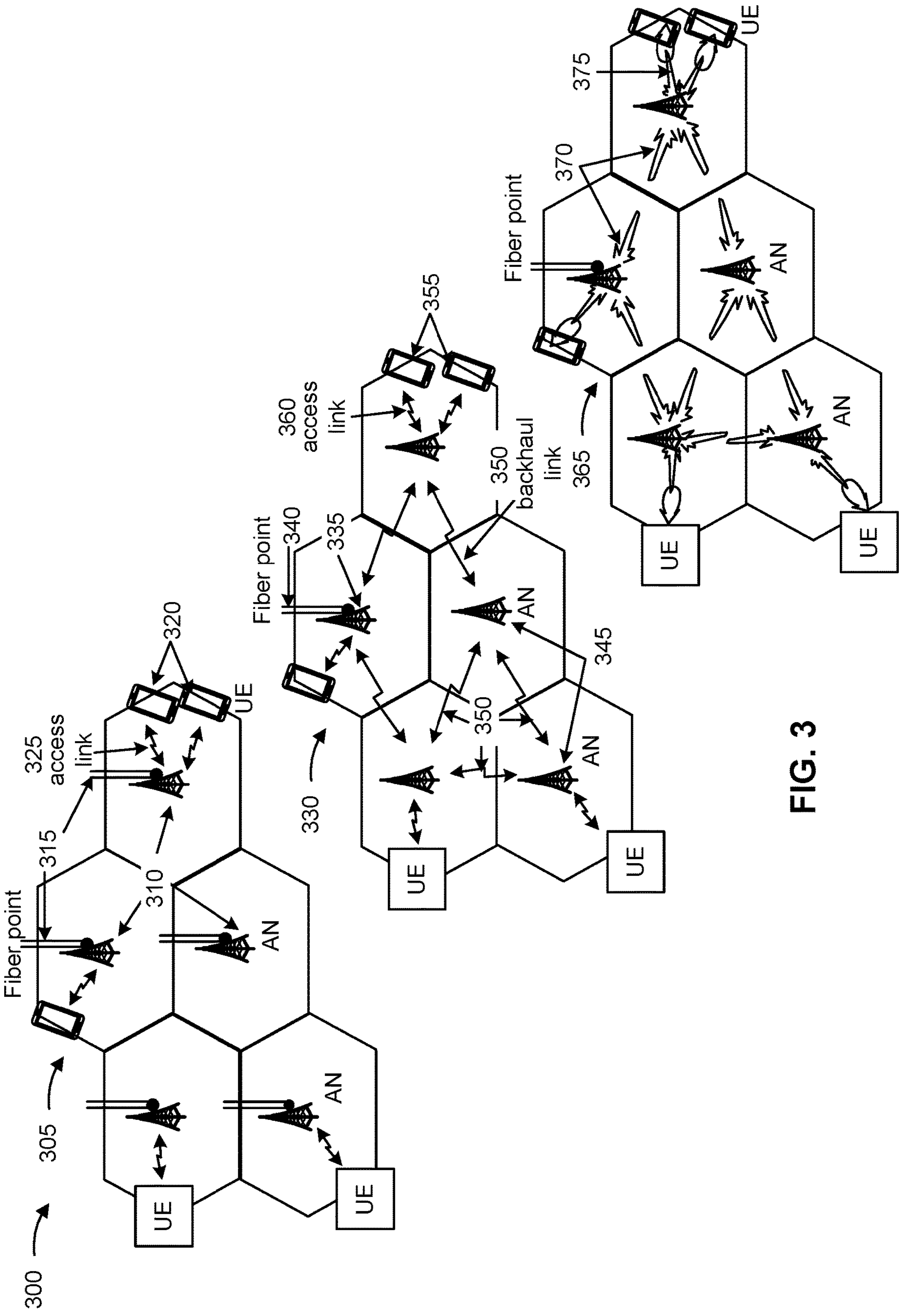
FIG. 3 is a diagram illustrating an example of radio access networks, in accordance with the present disclosure.

FIG. 3 is a diagram illustrating examples 300 of radio access networks, in accordance with the present disclosure.

FIG. 3 is a diagram illustrating examples 300 of radio access networks, in accordance with the present disclosure. As shown by reference number 305, a traditional (e.g., 3G, 4G, or LTE) radio access network may include multiple base stations 310 (e.g., access nodes (AN)), where each base station 310 communicates with a core network via a wired backhaul link 315, such as a fiber connection. A base station 310 may communicate with a UE 320 via an access link 325, which may be a wireless link. In some aspects, a base station 310 shown in FIG. 3 may be a base station 110 shown in FIG. 1. In some aspects, a UE 320 shown in FIG. 3 may be a UE 120 shown in FIG. 1.

As shown by reference number 330, a radio access network may include a wireless backhaul network, sometimes referred to as an IAB network. In an IAB network, at least one base station is an anchor base station 335 that communicates with a core network via a wired backhaul link 340, such as a fiber connection. An anchor base station 335 may also be referred to as an IAB donor (or IAB-donor). The IAB network may include one or more non-anchor base stations 345, sometimes referred to as relay base stations or IAB nodes (or IAB-nodes). The non-anchor base station 345 may communicate directly or indirectly with the anchor base station 335 via one or more backhaul links 350 (e.g., via one or more non-anchor base stations 345) to form a backhaul path to the core network for carrying backhaul traffic. Backhaul link 350 may be a wireless link. Anchor base station(s) 335 and/or non-anchor base station(s) 345 may communicate with one or more UEs 355 via access links 360, which may be wireless links for carrying access traffic. In some aspects, an anchor base station 335 and/or a non-anchor base station 345 shown in FIG. 3 may be a base station 110 shown in FIG. 1. In some aspects, a UE 355 shown in FIG. 3 may be a UE 120 shown in FIG. 1.

As shown by reference number 365, in some aspects, a radio access network that includes an IAB network may utilize millimeter wave technology and/or directional communications (e.g., beamforming) for communications between base stations and/or UEs (e.g., between two base stations, between two UEs, and/or between a base station and a UE). For example, wireless backhaul links 370 between base stations may use millimeter wave signals to carry information and/or may be directed toward a target base station using beamforming. Similarly, the wireless access links 375 between a UE and a base station may use millimeter wave signals and/or may be directed toward a target wireless node (e.g., a UE and/or a base station). In this way, inter-link interference may be reduced.

The configuration of base stations and UEs in FIG. 3 is shown as an example, and other examples are contemplated. For example, one or more base stations illustrated in FIG. 3 may be replaced by one or more UEs that communicate via a UE-to-UE access network (e.g., a peer-to-peer network or a device-to-device network). In this case, an anchor node may refer to a UE that is directly in communication with a base station (e.g., an anchor base station or a non-anchor base station).

As indicated above, FIG. 3 is provided as an example. Other examples may differ from what is described with regard to FIG. 3.

Figure 4:
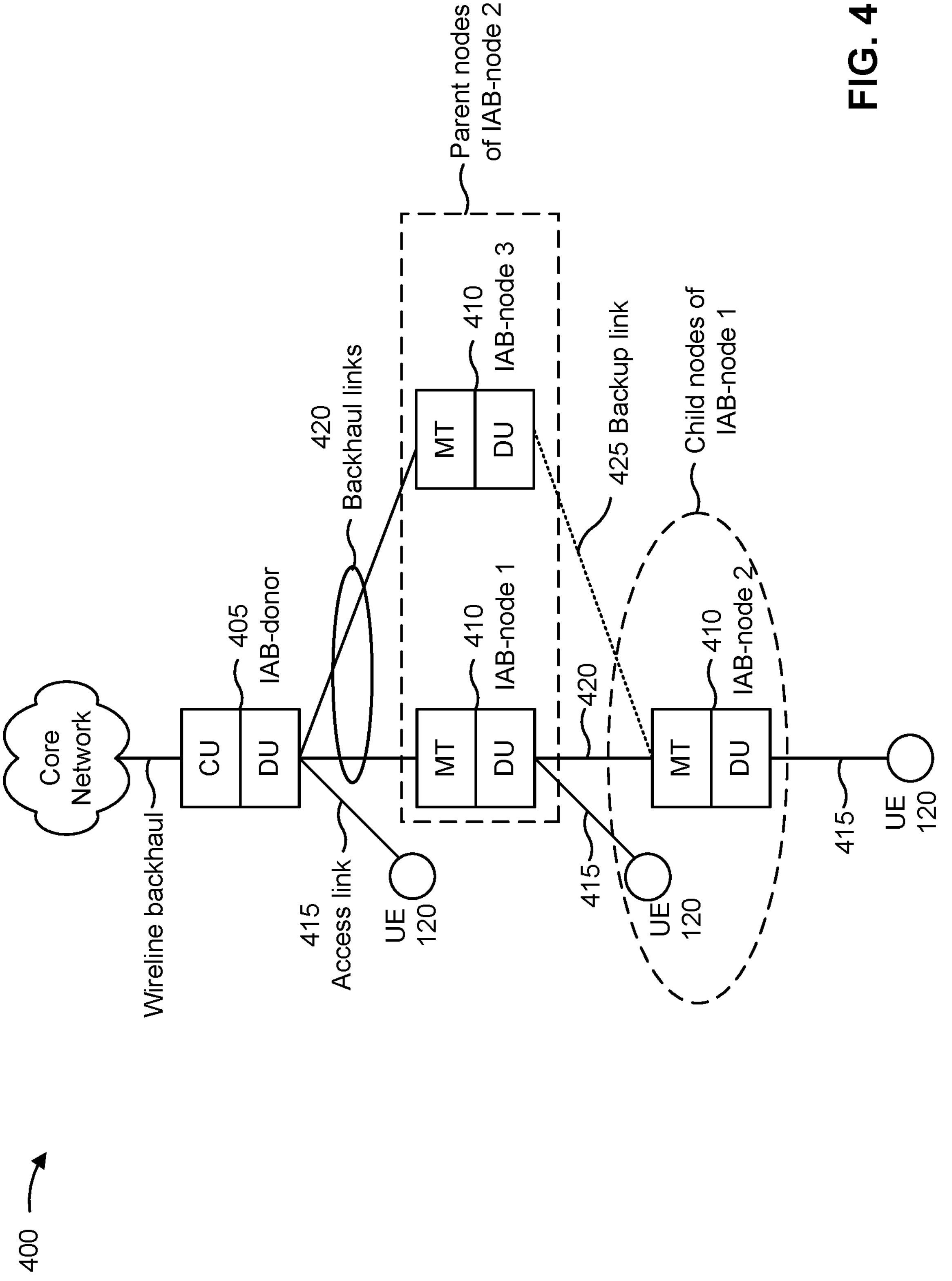
FIG. 4 is a diagram illustrating an example of integrated access and backhaul (IAB) network architecture, in accordance with the present disclosure.

FIG. 4 is a diagram illustrating an example 400 of an IAB network architecture, in accordance with the present disclosure.

As shown in FIG. 4, an IAB network may include an IAB donor 405 (shown as IAB-donor) that connects to a core network via a wired connection (shown as a wireline backhaul). For example, an Ng interface of an IAB donor 405 may terminate at a core network. Additionally, or alternatively, an IAB donor 405 may connect to one or more devices of the core network that provide a core access and mobility management function (AMF). In some aspects, an IAB donor 405 may include a base station 110, such as an anchor base station, as described above in connection with 3. As shown, an IAB donor 405 may include a CU, which may perform access node controller (ANC) functions and/or AMF functions. The CU may configure a DU of the IAB donor 405 and/or may configure one or more IAB nodes 410 (e.g., a mobile termination (MT) and/or a DU of an IAB node 410) that connect to the core network via the IAB donor 405. Thus, a CU of an IAB donor 405 may control and/or configure the entire IAB network that connects to the core network via the IAB donor 405, such as by using control messages and/or configuration messages (e.g., a radio resource control (RRC) configuration message or an F1 application protocol (F1-AP) message).

As further shown in FIG. 4, the IAB network may include IAB nodes 410 (shown as IAB-node 1, IAB-node 2, and IAB-node 3) that connect to the core network via the IAB donor 405. As shown, an IAB node 410 may include MT functions (also sometimes referred to as UE functions (UEF)) and may include DU functions (also sometimes referred to as access node functions (ANF)). The MT functions of an IAB node 410 (e.g., a child node) may be controlled and/or scheduled by another IAB node 410 (e.g., a parent node of the child node) and/or by an IAB donor 405. The DU functions of an IAB node 410 (e.g., a parent node) may control and/or schedule other IAB nodes 410 (e.g., child nodes of the parent node) and/or UEs 120. Thus, a DU may be referred to as a scheduling node or a scheduling component, and an MT may be referred to as a scheduled node or a scheduled component. In some aspects, an IAB donor 405 may include DU functions and not MT functions. That is, an IAB donor 405 may configure, control, and/or schedule communications of IAB nodes 410 and/or UEs 120. A UE 120 may include only MT functions, and not DU functions. That is, communications of a UE 120 may be controlled and/or scheduled by an IAB donor 405 and/or an IAB node 410 (e.g., a parent node of the UE 120).

When a first node controls and/or schedules communications for a second node (e.g., when the first node provides DU functions for the second node's MT functions), the first node may be referred to as a parent node of the second node, and the second node may be referred to as a child node of the first node. A child node of the second node may be referred to as a grandchild node of the first node. Thus, a DU function of a parent node may control and/or schedule communications for child nodes of the parent node. A parent node may be an IAB donor 405 or an IAB node 410, and a child node may be an IAB node 410 or a UE 120. Communications of an MT function of a child node may be controlled and/or scheduled by a parent node of the child node.

As further shown in FIG. 4, a link between a UE 120 (e.g., which only has MT functions, and not DU functions) and an IAB donor 405, or between a UE 120 and an IAB node 410, may be referred to as an access link 415. Access link 415 may be a wireless access link that provides a UE 120 with radio access to a core network via an IAB donor 405, and optionally via one or more IAB nodes 410. Thus, the network illustrated in 4 may be referred to as a multi-hop network or a wireless multi-hop network.

As further shown in FIG. 4, a link between an IAB donor 405 and an IAB node 410 or between two IAB nodes 410 may be referred to as a backhaul link 420. Backhaul link 420 may be a wireless backhaul link that provides an IAB node 410 with radio access to a core network via an IAB donor 405, and optionally via one or more other IAB nodes 410. In an IAB network, network resources for wireless communications (e.g., time resources, frequency resources, and/or spatial resources) may be shared between access links 415 and backhaul links 420. In some aspects, a backhaul link 420 may be a primary backhaul link or a secondary backhaul link (e.g., a backup backhaul link). In some aspects, a secondary backhaul link may be used if a primary backhaul link fails, becomes congested, and/or becomes overloaded, among other examples. For example, a backup link 425 between IAB-node 2 and IAB-node 3 may be used for backhaul communications if a primary backhaul link between IAB-node 2 and IAB-node 1 fails. As used herein, a node or a wireless node may refer to an IAB donor 405 or an IAB node 410.

As indicated above, FIG. 4 is provided as an example. Other examples may differ from what is described with regard to FIG. 4.

Figure 5:
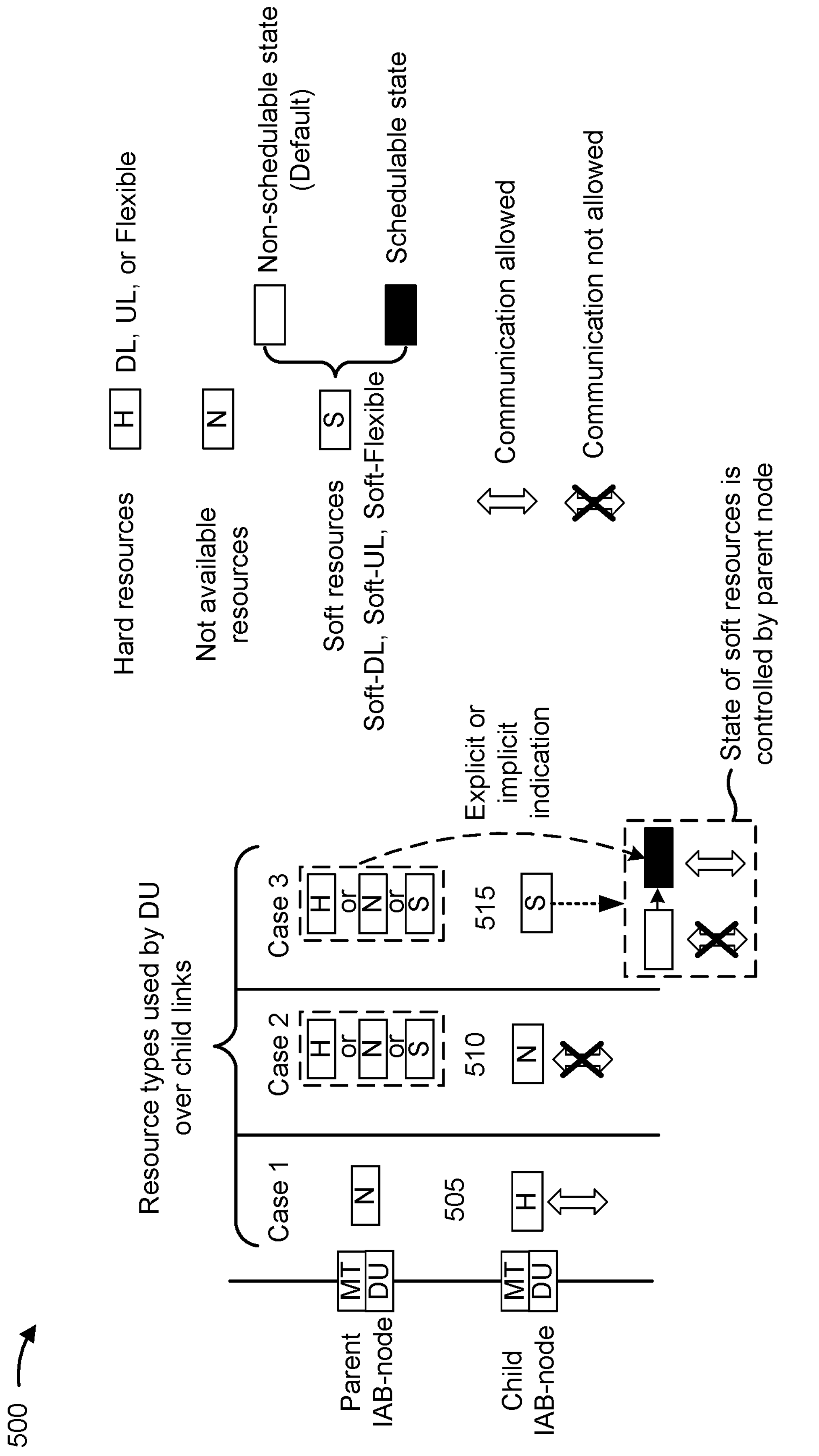
FIG. 5 is a diagram illustrating an example of resource types in an IAB network, in accordance with the present disclosure.

FIG. 5 is a diagram illustrating an example 500 of resource types in an IAB network, in accordance with the present disclosure.

In an IAB network, time domain resources (sometimes referred to as time resources) may be configured as downlink-only, uplink-only, flexible, or not available (e.g., unavailable). When a time resource is configured as downlink-only for a wireless node, that time resource may be available for only downlink communications of the wireless node, and not uplink communications. Similarly, when a time resource is configured as uplink-only for a wireless node, that time resource may be available for only uplink communications of the wireless node, and not downlink communications. When a time resource is configured as flexible for a wireless node, that time resource may be available for both downlink communications and uplink communications of the wireless node. When a time resource is configured as not available for a wireless node, that time resource may not be used for any communications of the wireless node.

Examples of downlink communications include synchronization signal blocks (SSBs), channel state information reference signals (CSI-RS), physical downlink control channel (PDCCH) communications, and/or physical downlink shared channel (PDSCH) communications. Examples of uplink communications include physical random access channel (PRACH) communications, physical uplink control channel (PUCCH) communications, physical uplink shared channel (PUSCH) communications, and/or sounding reference signals (SRSs).

Time resources in an IAB network that are configured as downlink-only, uplink-only, or flexible may be further configured as hard resources or soft resources. When a time resource is configured as a hard resource for a wireless node, that time resource is always available for communications of the wireless node. For example, a hard downlink-only time resource is always available for only downlink communications of the wireless node, a hard uplink-only time resource is always available for only uplink communications of the wireless node, and a hard flexible time resource is always available for uplink and downlink communications of the wireless node.

When a time resource is configured as a soft resource for a wireless node, the availability of that time resource is controlled by a parent node of the wireless node. For example, the parent node may indicate (e.g., explicitly or implicitly) whether a soft time resource is available for communications of the wireless node. Thus, a soft time resource may be in one of two states: a schedulable state (e.g., when the soft time resource is available for scheduling and/or communications of the wireless node) and a non-schedulable state (e.g., when the soft time resource is not available for scheduling and is not available for communications of the wireless node).

For example, a soft downlink-only time resource is only available for downlink communications of the wireless node when a parent node of the wireless node indicates that the soft downlink-only time resource is available. Similarly, a soft uplink-only time resource is only available for uplink communications of the wireless node when a parent node of the wireless node indicates that the soft uplink-only time resource is available. A soft flexible time resource is only available for uplink and downlink communications of the wireless node when a parent node of the wireless node indicates that the soft flexible time resource is available.

As an example, and as shown by reference number 505, a time resource may be configured as hard for a child node and may be configured as not available for a parent node of the child node. In this case, the parent node cannot communicate using that time resource, but the child node can schedule communications in that time resource and/or communicate using that time resource. This configuration may reduce interference between the parent node and the child node and/or may reduce scheduling conflicts between the parent node and the child node.

As another example, and as shown by reference number 510, a time resource may be configured as not available for the child node, and may be configured as hard, soft, or not available for the parent node (e.g., depending on a network configuration, network conditions, and/or a configuration of a parent node of the parent node). In this case, the child node cannot schedule communications in that time resource and cannot communicate using that time resource.

As another example, and as shown by reference number 515, a time resource may be configured as soft for the child node, and may be configured as hard, soft, or not available for the parent node (e.g., depending on a network configuration, network conditions, and/or a configuration of a parent node of the parent node). In this case, the child node cannot schedule or communicate using the time resource unless the child node receives an indication (e.g., a release indication), from the parent node (e.g., explicitly or implicitly), that the time resource is available (i.e., released) for use by the child node. If the child node receives such an indication, then the child node can schedule communications in that time resource and/or communicate using that time resource.

As indicated above, FIG. 5 is provided as an example. Other examples are possible and may differ from what was described with regard to FIG. 5.

Figure 6:
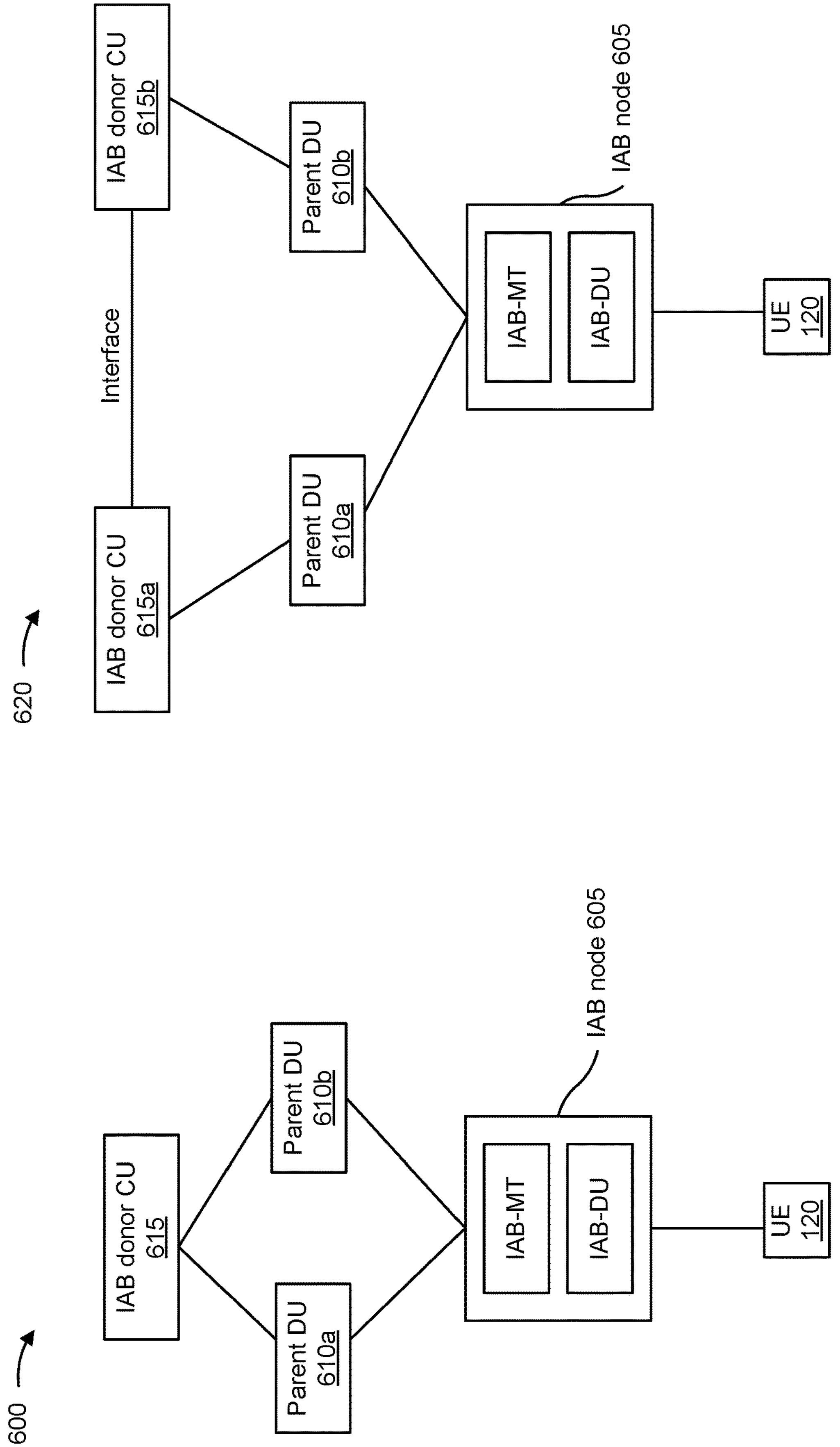
FIG. 6 is a diagram illustrating examples of a dual-connected IAB node, in accordance with the present disclosure.

FIG. 6 is a diagram illustrating examples 600 and 620 of a dual-connected IAB node, in accordance with the present disclosure. Dual connectivity may refer to a mode of operation in which a UE or an IAB node (e.g., an MT of an IAB node) can be configured to utilize the radio resources of two (or more) schedulers (e.g., two or more parent DUs). As shown in FIG. 6, example 600 shows an example of intra-donor dual connectivity for an IAB node, and example 620 shows an example of inter-donor dual connectivity for an IAB node.

As shown in examples 600 and 620, an IAB node 605 may be dual-connected to a first parent DU 610*a* and a second parent DU 610*b*. The IAB node 605 may include an MT unit (also referred to as an IAB-MT) and a DU (also referred to as an IAB-DU). The IAB-MT may be controlled and/or scheduled by the parent DUs 610*a* and 610*b*. The IAB-MT may receive downlink communications from the first parent DU 610*a* and/or the second parent DU 610*b*, and the IAB MT may transmit uplink communications to the first parent DU 610*a* and/or the second parent DU 610*b*. The IAB-DU may control and/or schedule one or more UEs (e.g., UE 120) and/or one or more other IAB nodes (e.g., child IAB nodes). The IAB-DU may transmit downlink communications to one or more UEs and/or one or more child IAB nodes, and the IAB-DU may receive uplink communications from one or more UEs and/or one or more child IAB nodes.

The first parent DU 610*a* may be a DU of a first parent node of the IAB node 605, and the second parent DU 610*b* may be a DU of a second parent node of the IAB node 605. For example, the parent DUs 610*a* and 610*b* may be IAB-DUs of parent IAB node of the IAB node 605, IAB donor DUs, or a combination thereof. In some examples, the parent DUs 610*a* and 610*b* may communicate with the IAB node 605 on different serving cells. In some examples, one parent node (e.g., the first parent DU 610*a* or the second parent DU 610*b*) may be a master node (MN), and the other parent node (e.g., the second parent DU 610*b* or the first parent DU 610*a*) may be a secondary node (SN). The IAB node 605 may communicate with the master node via a master cell group (MCG), and the IAB node 605 may communicate with the secondary node via a secondary cell group (SCG). In some examples, the connections between the IAB node 605 and the parent nodes (e.g., parent DUs 610*a* and 610*b*) may be in different frequency bands, such as different frequency bands within the same frequency range (e.g., FR2), or in the same frequency band (e.g., intra-band dual connectivity).

As shown in example 600, in some aspects, the first parent DU 610*a* and the second parent DU 610*b* may share the same IAB donor CU 615, which may be referred to as "intra-donor" dual connectivity. In this case, the same IAB donor CU 615 may support the first parent DU 610*a* and the second parent DU 610*b*. For example, the IAB donor CU 615 may provide cell resource configurations to the first parent DU 610*a* and the second parent DU 610*b*. The cell resource configurations may indicate at least part of the information described in connection with FIG. 5.

As shown in example 620, in some aspects, the first parent DU 610*a* and the second parent DU 610*b* may be supported by different IAB donor CUs, which may be referred to as "inter-donor" dual connectivity. As shown in example 620, a first IAB donor CU 615*a* may support the first parent DU 610*a*, and a second IAB donor CU 615*b* may support the second parent DU 610*b*. The first IAB donor CU 615*a* may provide, to the first parent DU 610*a*, one or more cell resource configurations (e.g., a respective cell resource configuration for each cell served by the first parent DU 610*a*). The second IAB donor CU 615*b* may provide, to the second parent DU 610*b*, one or more cell resource configurations (e.g., a respective cell resource configuration for each cell served by the second parent DU 610*b*). As further shown in example 620, the first IAB donor CU 615*a* and the second IAB donor CU 615*b* may communicate on an interface (e.g., an Xn interface and/or another similar interface). In some cases, coordination between the parent DUs 610*a* and 610*b* (e.g., to avoid and/or resolve possible conflicts) may be more difficult in inter-donor dual connectivity, as compared to intra-donor connectivity, due to the parent DUs 610 and 610*b* being associated with different CUs (e.g., IAB donor CUs 615*a* and 615*b*).

In some aspects, the IAB-MT of the dual-connected IAB node 605 (or a dual-connected UE) may be capable of simultaneous communications with the two parent nodes (e.g., the parent DUs 610*a* and 610*b*). For example, in some cases, the IAB-MT (or a UE) may be capable of simultaneous transmission and reception with the two parent nodes. In intra-donor dual connectivity cases (e.g., example 600), the IAB donor CU may be made aware of the IAB-MT's capability for simultaneous transmission and reception of multiple serving cells in a frequency band configured by the two parent nodes, for example via an indication sent from the IAB-MT to one of the parent nodes. In this, the IAB donor CU may determine whether to configure resources for simultaneous transmission and reception between the IAB-MT and the parent nodes based on the indicated capability of the IAB-MT. However, regardless of whether the IAB-MT (or UE) is capable of supporting simultaneous transmission and reception with the parent nodes, other factors may affect simultaneous communications with the parent nodes (e.g., simultaneous reception from both parent nodes, simultaneous transmission to both parent nodes, and/or simultaneous reception from one parent node and transmission to the other parent node). For example, some combinations of beams used by the IAB-MT (or UE) for simultaneous communications between the IAB-MT (or UE) and the parent nodes may cause large amounts of interference on the communications between the IAB-MT (or UE) and the parent nodes. Such interference diminishes throughput, increases chances of radio link failure, and relies on aggressive interference mitigation, which consumes power, processing resources, and network overhead.

Some techniques and apparatuses described herein enable a wireless node (e.g., an IAB-MT or a UE) that is dual-connected to a first parent node and a second parent node to transmit, to at least one of the first parent node or the second parent node, assistance information relating to simultaneous communication of the wireless node with the first parent node and the second parent node. For example, the wireless node may transmit, to a parent node, assistance information including requested configuration information for communications with the parent node (e.g., to reduce interference on simultaneous communications with the other parent node) or configuration information for communications between the wireless node and the other parent node (e.g., to allow the parent node to select a configuration that reduces interference on simultaneous communications). In some aspects, the wireless node may communicate with the parent nodes based at least in part on the assistance information. In some aspects, a parent node may receive assistance information relating to simultaneous communication of the wireless node with the first parent node and the second parent node, and the parent node may transmit communicate with the wireless node (e.g., while the other parent node is simultaneously communicating with the wireless node) based at least in part on the assistance information. In some aspects, a parent node may transmit, to the other parent node, the CU, or the wireless node, assistance information from the wireless node, the other parent node, or the CU. For example, to a parent node may transmit a recommended configuration for communication between the wireless node and the other parent node to the other parent node, to the wireless node (e.g., to be forward to the other parent node), or to the CU (e.g., to be transmitted to the other parent node via the CU of the other parent node). As a result, configurations for communications of the wireless node with the parent nodes may be coordinated to increase efficiency and reduce interference for simultaneous communications of the wireless node with the parent nodes. Such reduced interference may increase throughput, decrease chances of radio link failure, and decrease power consumption, processing resources, and network overhead associated with aggressive interference mitigation.

As indicated above, FIG. 6 is provided as an example. Other examples may differ from what is described with respect to FIG. 6.

Figure 7:
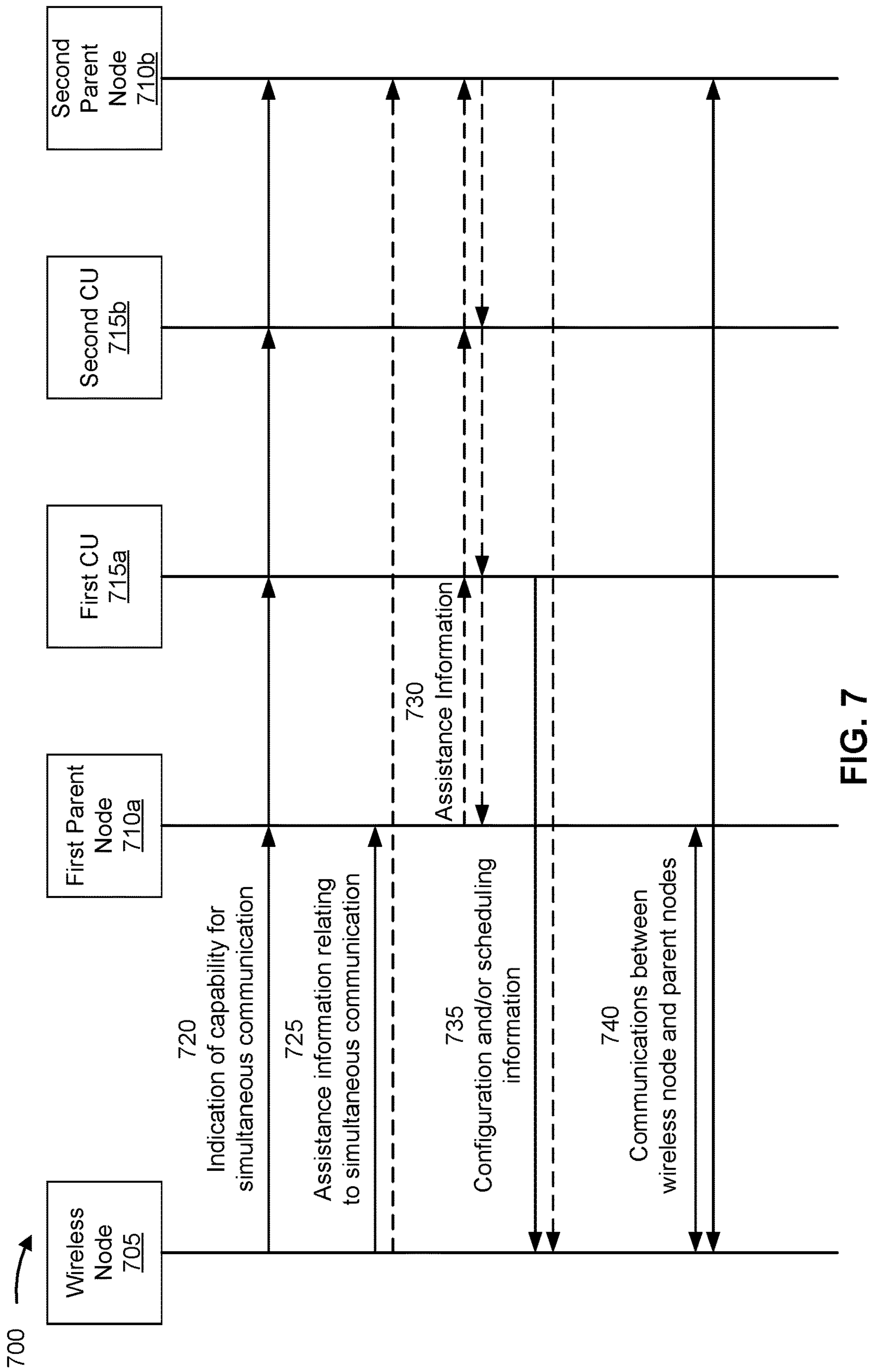
FIGS. 7-8 are diagrams illustrating examples associated with efficient simultaneous communication of a dual-connected wireless node, in accordance with the present disclosure.

FIG. 7 is a diagram illustrating an example 700 associated with efficient simultaneous communication of a dual-connected wireless node, in accordance with the present disclosure. As shown in FIG. 7, example 700 includes communication between a wireless node 705, a first parent node 710*a*, a second parent node 710*b*, a first CU 715*a*, and a second CU 715*b*. The wireless node 705 may be dual connected to the first parent node 710*a* and the second parent node 710*b*. In some aspects, the wireless node 705 may be or may be included in an IAB node (e.g., IAB node 605 and/or IAB node 410). In some aspects, the wireless node may be an IAB-MT. In some aspects, the wireless node 705 may be a UE (e.g., UE 120). The first parent node 710*a* and the second parent node 710*b* may be parent nodes to the wireless node 705. In some aspects, the first parent node 710*a* and the second parent node 710*b* may be or may be included in IAB donors (e.g., IAB donor 405), IAB nodes (e.g., IAB node 410), or a combination thereof. In some aspects, the first parent node 710*a* may be a first parent DU (e.g., a DU of an IAB donor or an IAB-DU), and the second parent node 710*b* may be a second parent DU (e.g., a DU of an IAB donor or an IAB-DU). In some aspects, the first parent node 710*a* may be an MN, and the second parent node 710*b* may be an SN. In some aspects, the second parent node 710*b* may be an MN, and the first parent node 710*a* may be an SN.

In some aspects, the first parent node 710*a* may be associated with the first CU 715*a*, and the second parent node 710*b* may be associated with the second CU 715*b*. In some aspects, the first CU 715*a* may be a first IAB donor CU and the second CU 715*b* may be a second IAB donor CU. For example, the first parent node 710*a* and the second parent node 710*b* may be associated with difference IAB donor CUs, and the dual connectivity between the wireless node 705 and the parent nodes 710*a* and 710*b* may be inter-donor dual connectivity. In this case, the first CU 715*a* and the second CU 715*b* may communicate on an interface (e.g., an Xn interface or another similar interface). In some aspects, the first parent node 710*a* and the second parent node 710*b* may be associated with the same IAB donor CU, and the dual connectivity between the wireless node 705 and the parent nodes 710*a* and 710*b* may be intra-donor dual connectivity. In this case, the first CU 715*a* and the second CU 715*b* may be the same IAB donor CU.

As shown in FIG. 7, and by reference number 720, the wireless node 705 may transmit, to the first parent node 710*a* and/or the second parent node 710*b*, an indication of a capability of the wireless node 705 for simultaneous communication with the first parent node 710*a* and the second parent node 710*b*. In some aspects, the indication may indicate whether the wireless node 705 is capable of simultaneous transmission to one parent node (e.g., the first parent node 710*a* or the second parent node 710*b*) and reception from the other parent node (e.g., the other of the first parent node 710*a* or the second parent node 710*b*). For example, the indication may include an indication of the capability of the wireless node 705 for simultaneous transmission and reception on multiple serving cells in a frequency band.

In some aspects, the indication of the capability of the wireless node 705 may be provided to the first CU 715*a* and the second CU 715*b*. In some aspects, the wireless node 705 may transmit the indication to one of the parent nodes (e.g., the first parent node 710*a* or the second parent node 710*b*), and the CU associated with that parent node may transmit the indication to the other CU over the interface between the CUs. For example, as shown in FIG. 7, the wireless node 705 may transmit the indication of the capability for simultaneous communication to the first parent node 710*a*. The first parent node 710*a* may receive the indication from the wireless node 705, and the first parent node 710*a* may transmit the indication to the first CU 715*a*. The first CU 715*a* may transmit the indication to the second CU 715*b*, which may then transmit the indication to the second parent node 710*b* and/or configure the second parent node 710*b* based at least in part on the indication.

In some aspects, in a case of inter-donor dual connectivity, the indication of the capability of the wireless node 705 for simultaneous communications may be exchanged between the first CU 715*a* and the second CU 715*b* as part of a SN addition process in which the connection between the wireless node 705 and the SN is established. For example, in a case in which the first parent node 710*a* is the MN and the second parent node 710*b* is the SN, the wireless node 705 may transmit the indication to the first parent node 710*a*. The first parent node 710*a* may transmit the indication to the first CU 715*a*, and the first CU 715*a* may provide the indication to the second CU 715*b* as part of the SN addition process.

As further shown in FIG. 7, and by reference number 725, the wireless node 705 may transmit, to the first parent node 710*a* and/or the second parent node 710*b*, assistance information relating to simultaneous communication of the wireless node 705 with the first parent node 710*a* and the second parent node 710*b*. In some aspects, the wireless node 705 may transmit the assistance information to either or both of the parent nodes 710*a* and 710*b*. Additionally, or alternatively, in some aspects, the wireless node 705 may transmit the assistance information to the either or both of the CUs 715*a* and 715*b*.

As shown in FIG. 7, the wireless node 705 may transmit assistance information relating to simultaneous communication of the wireless node 705 with the first parent node 710*a* and the second parent node 710*b* to the first parent node 710*a*. In some aspects, the wireless node 705 may transmit assistance information to the second parent node 710*b* in addition to or instead of the first parent node 710*a*. In some aspects, the wireless node 705 may transmit, to first parent node 710*a*, assistance information that includes requested configuration information for communication between the wireless node 705 and the first parent node 710*a* (e.g., to reduce interference on simultaneous communication between the wireless node 705 and the second parent node 710*b*). In some aspects, the wireless node 705 may transmit, to the first parent node 710*a*, assistance information that includes configuration information for communication between the wireless node and the other parent node (e.g., to allow the first parent node 710*a* to select a configuration for communication between the wireless node 705 and the first parent node 710*a* that reduces interference on simultaneous communication between the wireless node 705 and the second parent node 710*b*).

In some aspects, the wireless node 705 may transmit, to the first parent node 710*a*, an indication of a requested transmit (Tx) beam (e.g., a preferred/desired Tx beam) and/or a requested receive (Rx) beam (e.g., a preferred/desired Rx beam) for communication with the first parent node 710*a*. For example, the wireless node 705 may select the requested Tx beam and/or the requested Rx beam based at least in part on Tx and/or Rx beams configured for communication with the second parent node 710*b* (e.g., to select requested Tx/Rx beams to avoid interference on simultaneous communications with the first parent node 710*a* and the second parent node 710*b*). In some aspects, the wireless node 705 may transmit, to the first parent node 710*a*, an indication of one or more Tx beams and/or one or more Rx beams not preferred for communication with the first parent node 710*a*. For example, based at least in part on configured Tx and/or Rx beams for communication with the second parent node 710*b*, the wireless node 705 may identify one or more Tx beams and/or one or more Rx beams that will cause interference for simultaneous communications with the first parent node 710*a* and the second parent node 710*b*.

In some aspects, the wireless node 705 may transmit, to the first parent node 710*a*, an indication of one or more Tx beams and/or one or more Rx beams that the wireless node 705 is configured to use for communication with second parent node 710*b*. For example, based at least in part on the indication of the Tx and/Rx beams that the wireless node 705 is configured to use for communication with second parent node 710*b*, the second parent node 710*b* (or the first CU 715*a*) may select beams for the wireless node 705 to use for communication for the first parent node 710*a* (e.g., to reduce interference on simultaneous communications between the wireless node 705 and the parent nodes 710*a* and 710*b*).

In some aspects, the wireless node 705 may include the indication of the requested Tx and/or Rx beams, the not preferred Tx and/or Rx beams, and/or the configured Tx and/or Rx beams for communication with the second parent node 710*b* in a medium access control (MAC) control element (MAC-CE) or in uplink control information (UCI) (e.g., in a PUCCH transmission). For example, the wireless node 705 may indicate Tx and/or Rx beams (e.g., the requested Tx and/or Rx beams, the not preferred Tx and/or Rx beams, and/or the configured Tx and/or Rx beams for communication with the second parent node 710*b*) using a transmission configuration indicator (TCI) state identifier (ID), a spatial relation information ID, or a reference signal ID (e.g., for a CSI-RS, SRS, or SSB).

In some aspects, the wireless node 705 may transmit, to the first parent node 710*a*, an indication of at least one of requested guard symbols or a requested guard band for communication with the first parent node 710*a*. For example, the guard symbols may be a number of symbols in a time domain for antenna switching (e.g., switching between transmission and reception and/or switching between communicating with the first parent node 710*a* and communicating with the second parent node 710*b*). The guard band may be a band in the frequency domain between frequency bands used for uplink and downlink communications and/or between communications with the first parent node 710*a* and communications with the second parent node 710*b*. In some aspects, the wireless node 705 may transmit, to the first parent node 710*a*, an indication of guard symbols and/or a guard band provided, to the wireless node 705, by the second parent node 710*b* (e.g., configured by the second parent node 710*b*).

In some aspects, the wireless node 705 may transmit, to the first parent node 710*a*, an indication of a requested downlink Tx power adjustment for the first parent node 710*a* and/or a requested uplink Tx power (e.g., for a desired power spectral density (PSD) range) for the wireless node 705 to use for an uplink communication to the first parent node. For example, the wireless node 705 may determine the requested downlink Tx power adjustment and/or the requested uplink Tx power to reduce interference on simultaneous communications with the first parent node 710*a* and the second parent node 710*b*. In some aspects, the requested downlink power adjustment may be associated with specified time resources and/or resources configured for simultaneous communication of the wireless node 705 with the parent nodes 710*a* and 710*b*. In some aspects, the requested downlink power adjustment may be further associated with a spatial configuration (e.g., within one or more Rx beams to be used by the wireless node 705). In some aspects, the wireless node 705 may include the indication of the requested downlink power adjustment in a MAC-CE, a PUCCH communication (e.g., in UCI), or a channel state information (CSI) report.

In some aspects, the wireless node 705 may transmit, to the first parent node 710*a*, an indication of a downlink Rx power for a downlink communication from the second parent node 710*b*, an uplink Tx power for an uplink communication to the second parent node 710*b*, and/or a downlink transmit Tx adjustment for the second parent node 710*b*. For example, the first parent node 710*a* may determine the downlink power adjustment for the first parent node 710*a* and/or the uplink Tx power for the wireless node 705 to be used for communication with the wireless node 705 based at least in part on the indication of the downlink Rx power from the second parent node 710*b*, the uplink Tx power to the second parent node 710*b*, and/or the downlink power adjustment for the second parent node 710*b*.

In some aspects, the wireless node 705 may transmit, to the first parent node 710*a*, an indication of a requested downlink Tx timing adjustment for the first parent node 710*a* and/or or a requested uplink Tx timing for an uplink communication to the first parent node 710*a*. In some aspects, the wireless node 705 may transmit, to the first parent node 710*a*, an indication of a downlink Rx timing for a downlink communication from the second parent node and/or an uplink transmit timing for an uplink communication to the second parent node.

In some aspects, the wireless node 705 may transmit, to the first parent node 710*a*, an indication of a requested downlink reference signal configuration and/or a requested uplink reference signal (e.g., DMRS) configuration associated with the first parent node 710*a* (e.g., for a downlink reference signal to be transmitted from the first parent node 710*a* to the wireless node 705 and/or for an uplink reference signal to be transmitted from the wireless node 705 to the first parent node 710*a*). In some aspects, the wireless node 705 may transmit, to the first parent node 710*a*, an indication of at least one of a downlink reference signal configuration or an uplink reference signal (e.g., DMRS, CSI-RS, tracking reference signal (TRS), and/or SRS) configuration associated with the second parent node (e.g., a downlink reference signal and/or an uplink reference configured for the wireless node 705 by the second parent node 710*b*).

In some aspects, the assistance information may be associated with resources (e.g., time and/or frequency resources) that are configured for simultaneous communication, by the wireless node 705, with the first parent node 710*a* and the second parent node 710*b*. For example, the assistance information transmitted to the first parent node 710*a* may indicate configuration information (e.g., requested configuration information for communication between the wireless node 705 and the first parent node 710*a* and/or configuration information for communication between the wireless node 705 and the second parent node 710*b*) to be used for the resources configured for the simultaneous communications (e.g., resources for which the wireless node 705 is configured to support simultaneous communications). In some aspects, the assistance information may be associated with a set of time and/or frequency resources, such as a set of time and/or frequency resources indicated in the assistance information. In some aspects, the different assistance information may be associated with different sets of time and/or frequency resources.

In some aspects, the assistance information may associated with one or more resource types (flexible resources, downlink resources, and/or uplink resources). For example, the wireless node 705 may provide assistance information only for some types of resources. In some aspects, the assistance information may be associated with one or more types of signals or channels (e.g., PDSCH, PDCCH, PUSCH, PUCCH, and/or one or more reference signals, among other examples). For example, the wireless node 705 may provide assistance information only for some types of signals or channels.

In some aspects, the wireless node 705 may transmit the assistance information to only one parent node (e.g., the first parent node 710*a* or the second parent node 710*b*). In some aspects, the wireless node 705 may transmit the assistance information to the SN. For example, the wireless node 705 may transmit the assistance information to the first parent node 710*a* in a case in which the second parent node 710*b* is the MN and the first parent node 710*a* is the SN. In this case, the second parent node 710*b* (e.g., the MN) may configure the wireless node 705 for communication with the second parent node 710*b* without receiving assistance information, and the first parent node 710*a* (e.g., the SN) may configure the wireless node 705 for communication with the first parent node 710*a* based at least in part on the assistance information received from the SN. For example, the first parent node 710*a* (e.g., the SN), based at least in part on the requested configuration information indicated in the assistance information and/or the configuration information associated with the second parent node 710*b* indicated in the assistance information, may select configuration information for communication between the wireless node 705 and the first parent node 710*a* that reduces or avoids interference on simultaneous communication between the wireless node and the second parent node 710*b* (e.g., the MN).

For each parent node (e.g., the first parent node 710*a* and the second parent node 710*b*), there may be periodic resources (e.g., in downlink and uplink) that are associated with periodic and/or beam-swept communications, such as SSBs, CSI-RSs, random access channel (RACH) communications, scheduling requests, and/or system information block (SIB) type 1 (SIB1) transmissions. In some aspects, in cases of dual connectivity the first parent node 710*a* may be provided with the resource configuration for the periodic and/or beam-swept communications associated with the second parent node 710*b*, and the second parent node 710*b* may be provided with the resource configuration for the periodic and/or beam-swept communications associated with the first parent node 710*a*. In this case, each parent node may refrain from scheduling communications that may cause interference with the periodic and/or beam-swept communications associated with the other parent node. However, in some cases, the wireless node 705 may not use all of the configured resources for the periodic and/or beam-swept communications associated with one or both of the parent nodes 710*a* and 710*b*. For example, the configured resource may be associated with specific beam directions, and at a given time only communications on a small number of beam directions may be relevant for communication between the wireless node 705 and a parent node. In cases in which the wireless node 705 is static (e.g., a static IAB node) and/or moving slowly, a large subset of the resources configured for the periodic and/or beam-swept communications associated with one or both of the parent nodes 710*a* and 710*b* may not be used by the wireless node 705 for long time periods.

In some aspects, the wireless node 705 may transmit, to the first parent node 710*a*, assistance information including an indication of a utilization, by the wireless node 705, of resources configured for a plurality of periodic and/or beam-swept communications associated with the second parent node 710*b*. For example, the indication may indicate, to the first parent node 710*a*, which of the configured resources for the plurality of periodic and/or beam-swept communications associated with the second parent node 710*b* are being underutilized by the wireless node 705. The availability of this information at the first parent node 710*a* may provide enable the first parent node 710*a* to schedule communications with the wireless node 705 with increased flexibility and efficiency. For example, based at least in part on the indication of the utilization of the resources configured for the plurality of periodic and/or beam-swept communications associated with the second parent node 710*b*, the first parent node 710*a* may schedule communications with the wireless node 705 that make efficient use of resources that overlap (e.g., in the time domain) with the configured resources that are underutilized by the wireless node 705.

In some aspects, the wireless node 705 may transmit, to the first parent node 710*a*, a respective utilization indication for each the resources configured for a plurality of periodic or beam-swept communications associated with the second parent node 710*b*. In some aspects, the wireless node 705 may transmit, to the first parent node 710*a*, an indication that identifies one or more underutilized resources of the resources configured the plurality of periodic or beam-swept communications associated with the second parent node 710*b*. For example, the wireless node 705 may transmit the indicate the utilization for SSB resources, CSI-RS resources, scheduling request (SR) resources, RACH resources, SIB1 search space resources, and/or any other periodic and/or beam-swept communications associated with the second parent node 710*b*. In some aspects, transmission of the indication of the utilization may be dynamically triggered. For example, transmission of the indication of the utilization may be triggered based at least in part on a change to the relevant/configured Tx and/or Rx beams for wireless node 705 (e.g., for communication with the second parent node 710*b*). In some aspects, transmission of the indication of the utilization may be semi-statically configured (e.g., in an RRC configuration).

In some aspects, the utilization indication for a resource may be determined using a utilization metric. For example, the utilization metric may be a metric for indicating how often a resource is used for communication of the wireless node 705 with the second parent node 710*b*. In some aspects, the wireless node 705 (or the second parent node 710*b*) may measure the utilization of each resource (e.g., a number of times that the resource is used by the wireless node 705) over a time window. The utilization indication may be based at least in part on a comparison of the measured utilization of the resource over the time window and a threshold. For example, the utilization indication may indicate a utilization level based at least in part on a determination of whether the measured utilization over the time window satisfies the threshold. In some aspects, the utilization indication for each resource may be determined according to a utilization measurement configuration that specifies the time window, the threshold, and/or a periodicity for measuring the utilization.

In some aspects, because the first parent node 710*a* may be provided with information about the overall periodic and/or beam swept resources (e.g., SSB, RACH, SR, and/or CSI-RS resources) configured for the second parent node 710*b*, the indication of the utilization may identify the resources for which the utilization indications are provided using respective indexes (e.g., SSB indexes, RACH occasion (RO) indexes, SR indexes, and/or CSI-RS indexes) associated with the resources. For example, the indication may include, for each resource, an indication of a respective index associated with that resource and the respective utilization indication for that resource.

In some aspects, the wireless node 705 may also transmit, to the second parent node 710*b*, an indication of the utilization of resources configured for a plurality of periodic and/or beam swept communications associated with the first parent node 710*a*.

As further shown in FIG. 7, and by reference number 730, in some aspects, the first parent node 710*a* may transmit assistance information relating to simultaneous communication of the wireless node 705 with the parent nodes 710*a* and 710*b* to the first CU 715*a* and/or the second parent node 710*b*. In some aspects, as described in greater detail below in connection with FIG. 8, the assistance information transmitted by the first parent node 710*a* may include a recommended configuration (or a restricted configuration) for communication between the wireless node 705 and the second parent node 710*b*. For example, the first parent node 710*a* may determine the recommended configuration for communication between the wireless node 705 and the second parent node 710*b* based at least in part on the assistance information received from the wireless node 705. In some aspects, the first parent node 710*a* may transmit the assistance information including the recommended configuration to the first CU 715*a*. In this case, the first CU 715*a* may transmit the assistance information including the recommended configuration to the second CU 715*b* over the interface between the first CU 715*a* and the second CU 715*b*, and the second CU 715*b* may provide the assistance information including the recommended configuration to the second parent node 710*b*. In some aspects, the first parent node 710*a* may transmit the assistance information including the recommended configuration directly to the second parent node 710*b* (e.g., via over the air (OTA) signaling, sidelink communication, communication over a Uu interface in the case of multi-hop IAB, or communication over an inter-DU interface). In some aspects, the first parent node 710*a* may transmit the recommended configuration to the wireless node 705. In this case, the wireless node 705 may forward the recommended configuration to the second parent node 710*b* (e.g., in assistance information transmitted to second parent node 710*b*) and/or determine the assistance information to transmit to the second parent node 710*b* based at least in part on the recommended configuration.

In some aspects, the first parent node 710*a* may transmit assistance information including the indication of the utilization, by the wireless node 705, of resources configured for a plurality of periodic and/or beam-swept communications associated with the first parent node 710*a*. In some aspects, the first parent node 710*a*, instead of or in addition to the wireless node 705, may monitor the utilization, by wireless node 705, of the configured resources for the periodic and/or beam-swept communications associated with the first parent node 710*a*, and may transmit the indication of the utilization of the configured resources. For example, the first parent node 710*a* may measure and indicate the utilization similarly to as described above. In some aspects, the first parent node 710*a* may transmit the indication of the utilization (e.g., for the resources associated with the first parent node 710*a*) to the first CU 715*a*. In this case, the first CU 715*a* may transmit the indication of the utilization to the second CU 715*b* (e.g., over the interface between the first CU 715*a* and the second CU 715*b*), and the second CU 715*b* may provide, to the second parent node 710*b*, the indication of the utilization of the configured resources for the periodic and/or beam-swept communications associated with the first parent node 710*a*. In some aspects, the first parent node 710*a* may transmit the utilization indication directly to the second parent node 710*b* (e.g., via OTA signaling, sidelink communication, communication over a Uu interface in the case of multi-hop IAB, or communication over an inter-DU interface).

Additionally, or alternatively, the second parent node 710*b* may transmit assistance information relating to simultaneous communication of the wireless node 705 with the parent nodes 710*a* and 710*b* to the second CU 715*b* and/or the first parent node 710*a*. In some aspects, the assistance information transmitted by the second parent node 710*b* may include a recommended configuration (or a restricted configuration) for communication between the wireless node

705 and the first parent node 710*a*. In some aspects, the second parent node 710*b* may transmit the assistance information including the recommended configuration to the second CU 715*b*. In this case, the second CU 715*b* may transmit the assistance information including the recommended configuration to the first CU 715*a*, and the first CU 715*a* may provide the assistance information including the recommended configuration to the first parent node 710*a*. In some aspects, the second parent node 710*b* may transmit the assistance information including the recommended configuration directly to the first parent node 710*a* (e.g., via OTA signaling, sidelink communication, communication over a Uu interface in the case of multi-hop IAB, or communication over an inter-DU interface). In some aspects, the second parent node 710*b* may transmit the recommended configuration to the wireless node 705. In this case, the wireless node 705 may forward the recommended configuration to the first parent node 710*a* (e.g., in assistance information transmitted to the first parent node 710*a*) and/or determine the assistance information to transmit to the first parent node 710*a* based at least in part on the recommended configuration.

In some aspects, the second parent node 710*b* may transmit assistance information including the indication of the utilization, by the wireless node 705, of resources configured for a plurality of periodic and/or beam-swept communications associated with the second parent node 710*b*. In some aspects, the second parent node 710*b*, instead of or in addition to the wireless node 705, may monitor the utilization, by wireless node 705, of the configured resources for the periodic and/or beam-swept communications associated with the second parent node 710*b*, and may transmit the indication of the utilization of the configured resources. For example, the second parent node 710*b* may measure and indicate the utilization similarly to as described above. In some aspects, the second parent node 710*b* may transmit the indication of the utilization (e.g., for the resources associated with the second parent node 710*b*) to the second CU 715*b*. In this case, the second CU 715*b* may transmit the indication of the utilization to the first CU 715*a*, and the first CU 715*a* may provide, to the first parent node 710*a*, the indication of the utilization of the configured resources for the periodic and/or beam-swept communications associated with the second parent node 710*b*.

As further shown in FIG. 7, and by reference number 735, the first parent node 710*a* and/or the second parent node 710*b* may transmit, to the wireless node 705, configuration information and/or scheduling information. In some aspects, the first parent node 710*a* may transmit, to the wireless node 705, configuration information that configures communication between the wireless node 705 and the first parent node 710*a*. For example, the configuration information may configure communication between the wireless node 705 and the first parent node 710*a* for a set of resources (e.g., time and/or frequency resources), such as resources configured for simultaneous communication, by the wireless node 705, with the parent nodes 710*a* and 710*b*. In some aspects, the first parent node 710*a* may transmit, to the wireless node 705, scheduling information to schedule one or more communications (e.g., downlink and/or uplink communications) between the wireless node 705 and the first parent node 710*a*.

In some aspects, the first parent node 710*a* may determine the configuration information and/or the scheduling information based at least in part on assistance information received from the wireless node 705, the first CU 715*a*, and/or the second parent node 710*b*. In some aspects, based at least in part on the assistance information received from the wireless node 705 (and/or a recommended configuration determined by the second parent node 710*b*), the first parent node 710*a* may determine configuration information including at least one of: Tx and/or Rx beams for the wireless node 705 to use for communication with the first parent node 710*a*; guard symbols and/or guard bands for communication between the wireless node 705 and the first parent node 710*a*; an uplink Tx power for one or more uplink communications to the first parent node 710*a*; a downlink Tx power adjustment for one or more downlink communications from the first parent node 710*a*; an uplink Tx timing for one or more uplink communications to the first parent node 710*a*; a downlink reference signal configuration for a downlink reference signal from the first parent node 710*a*; and/or an uplink reference signal configuration for an uplink reference signal to be transmitted to the first parent node 710*a*. For example, the first parent node 710*a* may determine the configuration information based at least in part on requested configuration information indicated in the assistance information and/or configuration information associated with the second parent node 710*b* indicated in the assistance information. In some aspects, the first parent node 710*a* may determine the configuration information and/or the scheduling information based at least in part on the indication (e.g., received from the wireless node 705, the first CU 715*a*, or the second parent node 710*b*) of the utilization of the configured resources for the periodic and/or beam-swept communications associated with the second parent node 710*b*.

In some aspects, the second parent node 710*b* may transmit, to the wireless node 705, configuration information that configures communication between the wireless node 705 and the second parent node 710*b*. For example, the configuration information may configure communication between the wireless node 705 and the second parent node 710*b* for a set of resources (e.g., time and/or frequency resources), such as resources configured for simultaneous communication, by the wireless node 705, with the parent nodes 710*a* and 710*b*. In some aspects, the second parent node 710*b* may transmit, to the wireless node 705, scheduling information to schedule one or more communications (e.g., downlink and/or uplink communications) between the wireless node 705 and the second parent node 710*b*.

In some aspects, the first parent node 710*a* may determine the configuration information and/or the scheduling information based at least in part on assistance information received from the wireless node 705, the first CU 715*a*, and/or the second parent node 710*b*. In some aspects, the first parent node 710*a* may determine the configuration information based at least in part on the assistance information received from the wireless node 705 (and/or a recommended configuration determined by the first parent node 710*a*), similarly to as described above in connection with the first parent node 710*a*. In some aspects, the second parent node 710*b* may determine the configuration information and/or the scheduling information based at least in part on the indication (e.g., received from the wireless node 705, the second CU 715*b*, or the first parent node 710*a*) of the utilization of the configured resources for the periodic and/or beam-swept communications associated with the first parent node 710*a*.

As further shown in FIG. 7, and by reference number 740, the wireless node 705 may communicate with the first parent node 710*a* and the second parent node 710*b*. In some aspects, the wireless node 705 may communicate with the first parent node 710*a* and/or the second parent node 710*b* based at least in part on the assistance information transmitted to the first parent node 710*a* (e.g., from the wireless node 705, the first CU 715*a*, and/or the second parent node 710*b*) and/or the second parent node 710*b* (e.g., from the wireless node 705, the second CU 715*b*, and/or the first parent node 710*a*). For example, the wireless node 705 may communicate with the first parent node 710*a* and/or the second parent node 710*b* based at least in part on configuration information and/or scheduling information determined using the assistance information.

In some aspects, the wireless node 705 may simultaneously communicate with the first parent node 710*a* and the second parent node 710*b* based at least in part on the configuration information determined using the assistance information. This may result in efficient simultaneous communications with reduced interference. In some aspects, the simultaneous communications may include simultaneous uplink transmission to one parent node (e.g., the first parent node 710*a* or the second parent node 710*b*) and downlink reception from the other parent node (e.g., the other of the second parent node 710*b* or the first parent node 710*a*). In some aspects, the simultaneous communications may include simultaneous downlink reception from both parent nodes 710*a* and 710*b*. In some aspects, the simultaneous communications may include simultaneous uplink transmission to both parent nodes 710*a* and 710*b*.

As indicated above, FIG. 7 is provided as an example. Other examples may differ from what is described with respect to FIG. 7.

Figure 8:
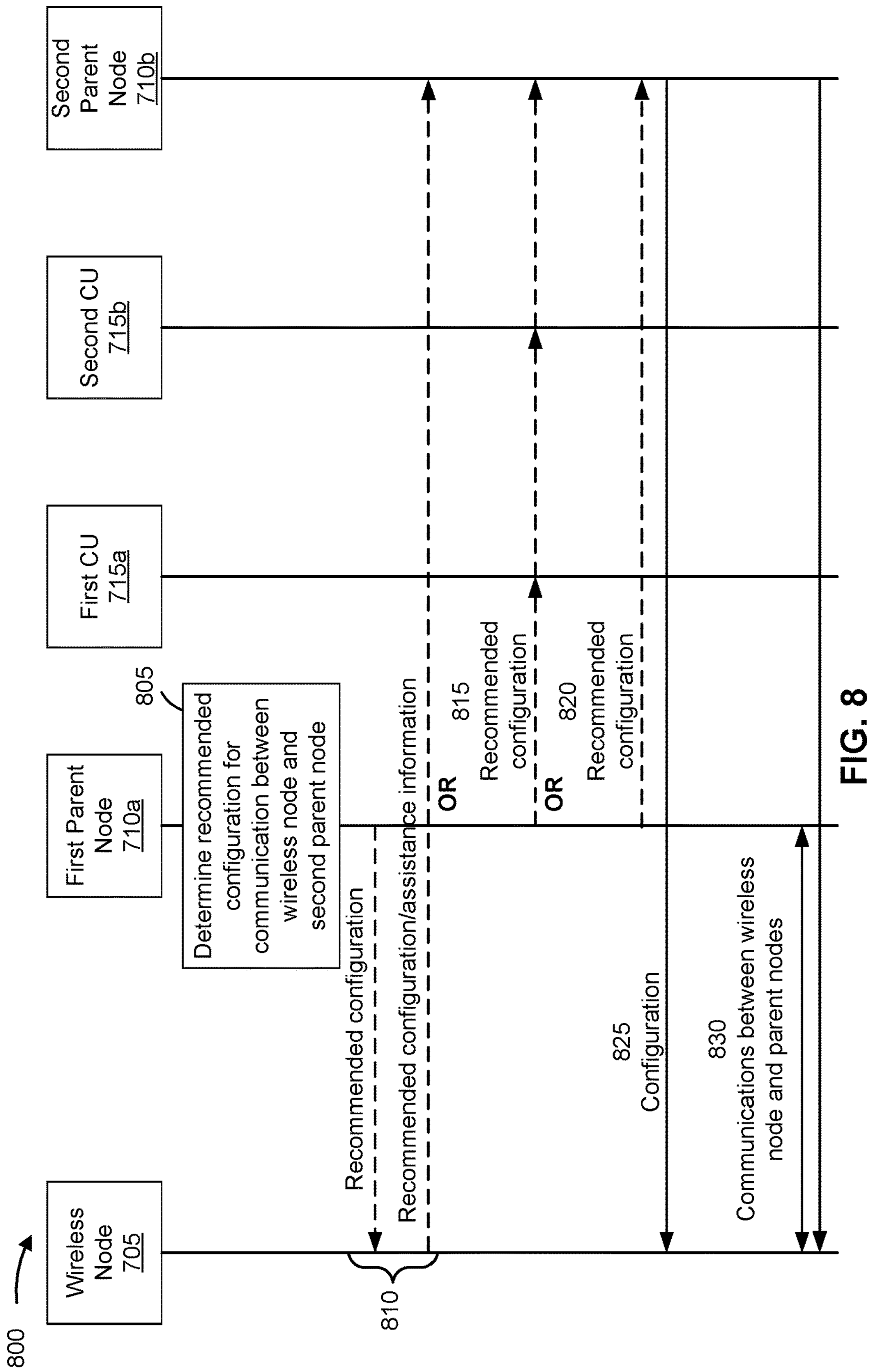

FIG. 8 is a diagram illustrating an example 800 associated with efficient simultaneous communication of a dual-connected wireless node, in accordance with the present disclosure. As shown in FIG. 8, example 800 includes communication between a wireless node 705, a first parent node 710*a*, a second parent node 710*b*, a first CU 715*a*, and a second CU 715*b*. The wireless node 705 may be dual connected to the first parent node 710*a* and the second parent node 710*b*. In some aspects, the wireless node 705 may be or may be included in an IAB node (e.g., IAB node 605 and/or IAB node 410). In some aspects, the wireless node may be an IAB-MT. In some aspects, the wireless node 705 may be a UE (e.g., UE 120). The first parent node 710*a* and the second parent node 710*b* may be parent nodes to the wireless node 705. In some aspects, the first parent node 710*a* and the second parent node 710*b* may be or may be included in IAB donors (e.g., IAB donor 405), IAB nodes (e.g., IAB node 410), or a combination thereof. In some aspects, the first parent node 710*a* may be a first parent DU (e.g., a DU of an IAB donor or an IAB-DU), and the second parent node 710*b* may be a second parent DU (e.g., a DU of an IAB donor or an IAB-DU). In some aspects, the first parent node 710*a* may be an MN, and the second parent node 710*b* may be an SN. In some aspects, the second parent node 710*b* may be an MN, and the first parent node 710*a* may be an SN.

In some aspects, the first parent node 710*a* may be associated with the first CU 715*a*, and the second parent node 710*b* may be associated with the second CU 715*b*. In some aspects, the first CU 715*a* may be a first IAB donor CU and the second CU 715*b* may be a second IAB donor CU. For example, the first parent node 710*a* and the second parent node 710*b* may be associated with difference IAB donor CUs, and the dual connectivity between the wireless node 705 and the parent nodes 710*a* and 710*b* may be inter-donor dual connectivity. In this case, the first CU 715*a* and the second CU 715*b* may communicate on an interface (e.g., an Xn interface or another similar interface). In some aspects, the first parent node 710*a* and the second parent node 710*b* may be associated with the same IAB donor CU, and the dual connectivity between the wireless node 705 and the parent nodes 710*a* and 710*b* may be intra-donor dual connectivity. In this case, the first CU 715*a* and the second CU 715*b* may be the same IAB donor CU.

As shown in FIG. 8, and by reference number 805, the first parent node 710*a* may determine a recommended configuration for communication between the wireless node 705 and the second parent node 710*b*. In some aspects, the recommended configuration may include recommended configuration information to be used for communication between the first parent node 710*a* and the second parent node 710*b*. For example, the recommended configuration may include an indication of at least one of: an indication of a recommended Tx beam and/or a recommended Rx beam for the wireless node 705 to use for communication with the second parent node 710*b*; an indication of at least one of recommended guard symbols or recommended guard bands for communication between the wireless node 705 and the second parent node 710*b*; an indication of a recommended uplink Tx power to be used by the wireless node 705 for one or more uplink communications to the second parent node 710*b*; an indication of a recommended uplink Tx timing for one or more uplink communications to the second parent node 710*b*; an indication of a recommended downlink reference signal configuration for a downlink reference signal from the second parent node 710*b*; an indication of a recommended uplink reference signal configuration for an uplink reference signal to be transmitted to the second parent node 710*b*; and/or an indication of a recommended downlink Tx power for the second parent node 710*b* for one or more downlink communications to the wireless node 705.

In some aspects, the first parent node 710*a* may determine the recommended configuration for communication between the wireless node 705 and the second parent node 710*b* based at least in part on a configuration of the wireless node 705 for communication with the first parent node 710*a*. For example, the first parent node 710*a* may select the recommended configuration information in the recommended configuration to reduce (e.g., minimize) interference on communications between the wireless node 705 and the first parent node 710*a* from simultaneous communications between the wireless node 705 and the second parent node 710*b*. In some aspects, the first parent node 710*a* may determine the recommended configuration for the communication between the wireless node 705 and the second parent node 710*b* based at least in part on assistance information received from the wireless node 705, such as the assistance information described above in connection with FIG. 7. In some aspects, the first parent node 710*a* may determine the recommended configuration for communication between the wireless node 705 and the second parent node 710*b* without receiving the assistance information and/or prior to receiving the assistance information.

In some aspects, the recommended configuration may include one or more restrictions on the configuration for communication between the wireless node 705 and the second parent node 710*b*. For example, in a case in which the first parent node 710*a* is associated with a higher priority than the second parent node 710*b*, such as in a case in which the first parent node 710*a* is the MN and the second parent node 710*b* is the SN, the first parent node 710*a* may restrict the configuration for the communication between the wireless node 705 and the second parent node 710*b* to comply with one or more restrictions on the configuration information. In some aspects, the recommended configuration may include one or more recommendations for the configuration information (that the second parent node 710*b* may select whether to follow) and one or more restrictions on the configuration information (that the second parent node is restricted to follow).

In some aspects, the recommended configuration for communication between the wireless node 705 and the second parent node 710*b* may be associated with resources (e.g., time and/or frequency resources) that are configured for simultaneous communication, by the wireless node 705, with the first parent node 710*a* and the second parent node 710*b*. For example, the recommended configuration may indicate recommended configuration information (and/or restrictions on configuration information) to be used for the resources configured for the simultaneous communications with the parent nodes 710*a* and 710*b* (e.g., resources for which the wireless node 705 is configured to support simultaneous communications). In some aspects, the recommended configuration for communication between the wireless node 705 and the second parent node 710*b* may be associated with a set of time and/or frequency resources, such as a set of time and/or frequency resources indicated in the recommended configuration. In some aspects, the recommended configuration for communication between the wireless node 705 and the second parent node 710*b* may associated with one or more resource types (flexible resources, downlink resources, and/or uplink resources) and/or one or more types of signals or channels (e.g., PDSCH, PDCCH, PUSCH, PUCCH, among other examples).

As further shown in FIG. 8, and by reference number 810, in some aspects, the first parent node 710*a* may transmit, to the wireless node 705, the recommended configuration for communication between the wireless node 705 and the second parent node 710*b*. The wireless node 705 may receive the recommended configuration for communication between the wireless node 705 and the second parent node 710*b*, and the wireless node 705 may transmit, to the second parent node 710*b*, the recommended configuration and/or assistance information based at least in part on the recommended configuration. In some aspects, the wireless node 705 may transmit the recommended configuration to the second parent node 710*b*. For example, the recommended configuration may be included in assistance information transmitted to the second parent node 710*b* from the wireless node 705. In some aspects, the wireless node 705 may determine assistance information based at least in part on the recommended configuration for communication between the wireless node 705 and the second parent node 710*b*. For example, the wireless node 705 may select a subset of the recommended configuration information included in the recommended configuration, and the wireless node 705 may transmit, to the second parent node 710*b*, assistance information indicating the selected subset of recommended configuration information.

As further shown in FIG. 8, and by reference number 815, in some aspects, the first parent node 710*a* may transmit, to the first CU 715*a*, the recommended configuration for communication between the wireless node 705 and the second parent node 710*b*. The first CU 715*a* may transmit the recommended configuration to the second CU 715*b* over the interface between the first CU 715*a* and the second CU 715*b*. The second CU 715*b* may provide/transmit the recommended configuration to the second parent node 710*b*.

As further shown in FIG. 8, and by reference number 820, in some aspects, the first parent node 710*a* may transmit to recommended configuration for communication between the wireless node 705 and the second parent node 710*b* directly to the second parent node 710*b*. For example, the first parent node 710*a* may transmit the recommended configuration to the second parent node 710*b* via OTA signaling, sidelink communication, communication over a Uu interface (e.g., in the case of multi-hop IAB), or communication over an inter-DU interface.

As further shown in FIG. 8, and by reference number 825, the second parent node 710*b* may transmit, to the wireless node 705, a configuration for communication between the wireless node 705 and the second parent node 710*b*. In some aspects, the second parent node 710*b* may transmit, to the wireless node 705, configuration information that configures communication between the wireless node 705 and the second parent node 710*b*. For example, the configuration information may configure communication between the wireless node 705 and the second parent node 710*b* for a set of resources (e.g., time and/or frequency resources), such as resources configured for simultaneous communication, by the wireless node 705, with the parent nodes 710*a* and 710*b*. In some aspects, the second parent node 710*b* may receive (e.g., from the first parent node 710*a*, the second CU 715*b*, or the wireless node 705) the recommended configuration for communication between the wireless node 705 and the second parent node 710*b*, and the second parent node 710*b* may determine the configuration for communication between the wireless node 705 and the second parent node 710*b* based at least in part on the recommended configuration. For example, the second parent node 710*b* may select all or a subset of the recommended configuration information indicated in the recommended configuration to be included in the configuration transmitted to the wireless node 705. In some aspects, in a case in which the recommended configuration includes one or more restrictions on the configuration information, the second parent node 710*b* may select configuration information that complies with the one or more restrictions.

As further shown in FIG. 8, and by reference number 830, the wireless node 705 may communicate with the first parent node 710*a* and the second parent node 710*b*. In some aspects, the wireless node 705 may communicate with the first parent node 710*a* and/or the second parent node 710*b* based at least in part on the recommended configuration determined by the first parent node 710*a*. For example, the wireless node 705 may communicate with the second parent node 710*b* based at least in part on a configuration determined from the recommender configuration. In some aspects, the wireless node 705 may communicate with the second parent node 710*b* using the configuration determined based at least in part on the recommended configuration, while simultaneously communicating with the first parent node 710*a*. This may result in efficient simultaneous communications with reduced interference. In some aspects, the simultaneous communications may include simultaneous uplink transmission to one parent node (e.g., the first parent node 710*a* or the second parent node 710*b*) and downlink reception from the other parent node (e.g., the other of the second parent node 710*b* or the first parent node 710*a*). In some aspects, the simultaneous communications may include simultaneous downlink reception from both parent nodes 710*a* and 710*b*. In some aspects, the simultaneous communications may include simultaneous uplink transmission to both parent nodes 710*a* and 710*b*.

As indicated above, FIG. 8 is provided as an example. Other examples may differ from what is described with respect to FIG. 8.

Figure 9:
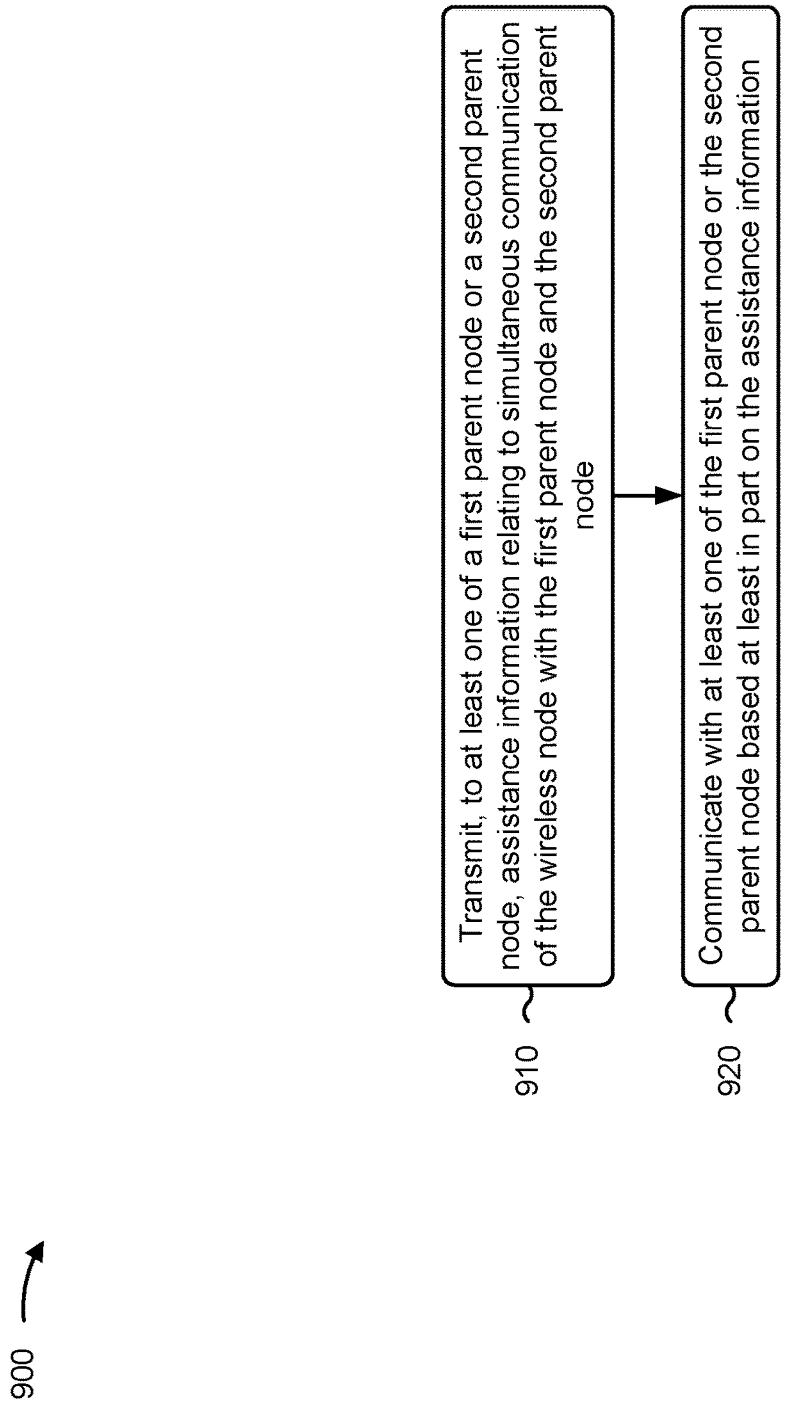
FIGS. 9-11 are diagrams illustrating example processes associated with efficient simultaneous communication of a dual-connected wireless node, in accordance with the present disclosure.

FIG. 9 is a diagram illustrating an example process 900 performed, for example, by a wireless node, in accordance with the present disclosure. Example process 900 is an example where the wireless node (e.g., wireless node 705) performs operations associated with efficient simultaneous communication of a dual-connected wireless node.

As shown in FIG. 9, in some aspects, process 900 may include transmitting, to at least one of a first parent node or a second parent node, assistance information relating to simultaneous communication of the wireless node with the first parent node and the second parent node (block 910). For example, the wireless node (e.g., using communication manager 1250 and/or transmission component 1204, depicted in FIG. 12) may transmit, to at least one of a first parent node or a second parent node, assistance information relating to simultaneous communication of the wireless node with the first parent node and the second parent node, as described above.

As further shown in FIG. 9, in some aspects, process 900 may include communicating with at least one of the first parent node or the second parent node based at least in part on the assistance information (block 920). For example, the wireless node (e.g., using communication manager 1250, reception component 1202, and/or transmission component 1204, depicted in FIG. 12) may communicate with at least one of the first parent node or the second parent node based at least in part on the assistance information, as described above.

Process 900 may include additional aspects, such as any single aspect or any combination of aspects described below and/or in connection with one or more other processes described elsewhere herein.

In a first aspect, process 900 includes transmitting, to at least one of the first parent node or the second parent node, an indication of a capability of the wireless node for simultaneous communication with the first parent node and the second parent node.

In a second aspect, alone or in combination with the first aspect, the indication includes an indication of a capability of the wireless node for simultaneous transmission and reception on multiple serving cells in a frequency band.

In a third aspect, alone or in combination with one or more of the first and second aspects, transmitting the assistance information includes transmitting, to the first parent node, an indication of at least one of a requested transmit beam or a requested receive beam for communication with the first parent node.

In a fourth aspect, alone or in combination with one or more of the first through third aspects, transmitting the assistance information includes transmitting, to the first parent node, an indication of at least one of a transmit beam or a receive beam not preferred for communication with the first parent node.

In a fifth aspect, alone or in combination with one or more of the first through fourth aspects, transmitting the assistance information includes transmitting, to the first parent node, an indication of at least one of one or more transmit beams or one or more receive beams that the wireless node is configured to use for communication with the second parent node.

In a sixth aspect, alone or in combination with one or more of the first through fifth aspects, transmitting the assistance information includes transmitting, to the first parent node, an indication of at least one of requested guard symbols or a requested guard band.

In a seventh aspect, alone or in combination with one or more of the first through sixth aspects, transmitting the assistance information includes transmitting, to the first parent node, an indication of at least one of guard symbols or a guard band provided by the second parent node.

In an eighth aspect, alone or in combination with one or more of the first through seventh aspects, transmitting the assistance information includes transmitting, to the first parent node, an indication of at least one of a requested downlink transmit power adjustment for the first parent node or a requested uplink transmit power for an uplink communication to the first parent node.

In a ninth aspect, alone or in combination with one or more of the first through eighth aspects, transmitting the assistance information includes transmitting, to the first parent node, an indication of at least one of a downlink receive power for a downlink communication from the second parent node, an uplink transmit power for an uplink communication to the second parent node, or a downlink transmit power adjustment for the second parent node.

In a tenth aspect, alone or in combination with one or more of the first through ninth aspects, transmitting the assistance information includes transmitting, to the first parent node, an indication of at least one of a requested downlink transmit timing adjustment for the first parent node or a requested uplink transmit timing for an uplink communication to the first parent node.

In an eleventh aspect, alone or in combination with one or more of the first through tenth aspects, transmitting the assistance information includes transmitting, to the first parent node, an indication of at least one of a downlink receive timing for a downlink communication from the second parent node or an uplink transmit timing for an uplink communication to the second parent node.

In a twelfth aspect, alone or in combination with one or more of the first through eleventh aspects, transmitting the assistance information includes transmitting, to the first parent node, an indication of at least one of a requested downlink reference signal configuration or a requested uplink reference signal configuration associated with the first parent node.

In a thirteenth aspect, alone or in combination with one or more of the first through twelfth aspects, transmitting the assistance information includes transmitting, to the first parent node, an indication of at least one of a downlink reference signal configuration or an uplink reference signal configuration associated with the second parent node.

In a fourteenth aspect, alone or in combination with one or more of the first through thirteenth aspects, the assistance information is associated with resources configured for simultaneous communication with the first parent node and the second parent node.

In a fifteenth aspect, alone or in combination with one or more of the first through fourteenth aspects, the assistance information is associated with a set of time and frequency resources.

In a sixteenth aspect, alone or in combination with one or more of the first through fifteenth aspects, transmitting the assistance information includes transmitting the assistance information to the first parent node, wherein the first parent node is a secondary node and the second parent node is a master node.

In a seventeenth aspect, alone or in combination with one or more of the first through sixteenth aspects, the assistance information is associated with at least one of a resource type, a signal type, or a channel type.

In an eighteenth aspect, alone or in combination with one or more of the first through seventeenth aspects, process 900 includes receiving, from the first parent node, a configuration for communication with the first parent node based at least in part on transmitting the assistance information to the first parent node.

In a nineteenth aspect, alone or in combination with one or more of the first through eighteenth aspects, process 900 includes receiving, from the first parent node, a recommended configuration for communication between the wireless node and the second parent node.

In a twentieth aspect, alone or in combination with one or more of the first through nineteenth aspects, transmitting the assistance information includes transmitting the assistance information to the second parent node, and the assistance information is based at least in part on the recommended configuration for communication between the wireless node and the second parent node.

In a twenty-first aspect, alone or in combination with one or more of the first through twentieth aspects, transmitting the assistance information includes transmitting, to the second parent node, the recommended configuration for communication between the wireless node and the second parent node.

In a twenty-second aspect, alone or in combination with one or more of the first through twenty-first aspects, transmitting the assistance information includes transmitting the assistance information to the first parent node, and receiving, from the first parent node, the recommended configuration for communication between the wireless node and the second parent node is based at least in part on transmitting the assistance information to the first parent node.

In a twenty-third aspect, alone or in combination with one or more of the first through twenty-second aspects, process 900 includes transmitting, to the second parent node, the recommended configuration for communication between the wireless node and the second parent node.

In a twenty-fourth aspect, alone or in combination with one or more of the first through twenty-third aspects, the recommended configuration for communication between the wireless node and the second parent node includes at least one of an indication of at least one of a transmit beam or receive beam for the wireless node to use for communication with the second parent node, an indication of at least one of guard symbols or guard bands for communication with the second parent node, an indication of an uplink transmit power for an uplink communication to the second parent node, an indication of an uplink transmit timing for an uplink communication to the second parent node, an indication of at least one of a downlink reference signal configuration or an uplink reference signal configuration, or an indication of a downlink transmit power for the second parent node.

In a twenty-fifth aspect, alone or in combination with one or more of the first through twenty-fourth aspects, the recommended configuration for communication between the wireless node and the second parent node is associated with resources configured for simultaneous communication with the first parent node and the second parent node.

In a twenty-sixth aspect, alone or in combination with one or more of the first through twenty-fifth aspects, the recommended configuration for communication between the wireless node and the second parent node is associated with a set of time and frequency resources.

In a twenty-seventh aspect, alone or in combination with one or more of the first through twenty-sixth aspects, the recommended configuration for communication between the wireless node and the second parent node is associated with at least one of a resource type, a signal type, or a channel type.

In a twenty-eighth aspect, alone or in combination with one or more of the first through twenty-seventh aspects, transmitting the assistance information includes transmitting, to the first parent node, an indication of a utilization, by the wireless node, of resources configured for a plurality of periodic or beam-swept communications associated with the second parent node.

In a twenty-ninth aspect, alone or in combination with one or more of the first through twenty-eighth aspects, transmitting the indication of the utilization of the resources configured for the plurality of periodic or beam-swept communications associated with the second parent node includes transmitting a respective utilization indication for each resource of the resources configured for the plurality of periodic or beam-swept communications associated with the second parent node.

In a thirtieth aspect, alone or in combination with one or more of the first through twenty-ninth aspects, the respective utilization indication for each resource is based at least in part on a comparison of a measured utilization of that resource over a time window and a threshold.

In a thirty-first aspect, alone or in combination with one or more of the first through thirtieth aspects, transmitting the respective utilization indication for each resource of the resources configured for the plurality of periodic or beam-swept communications associated with the second parent node includes transmitting, for each resource of the resources configured for the plurality of periodic or beam-swept communications associated with the second parent node, an indication of a respective index associated with that resource and the respective utilization indication for that resource.

In a thirty-second aspect, alone or in combination with one or more of the first through thirty-first aspects, the resources configured for the plurality of periodic or beam-swept communications associated with the second parent node include at least one of SSB resources, CSI-RS resources, SR resources, RACH resources, or SIB1 search space resources.

In a thirty-third aspect, alone or in combination with one or more of the first through thirty-second aspects, communicating with at least one of the first parent node or the second parent node includes communicating with the first parent node and the second parent node simultaneously based at least in part on the assistance information.

In a thirty-fourth aspect, alone or in combination with one or more of the first through thirty-third aspects, the wireless node is an IAB-MT.

In a thirty-fifth aspect, alone or in combination with one or more of the first through thirty-fourth aspects, the wireless node is a UE.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
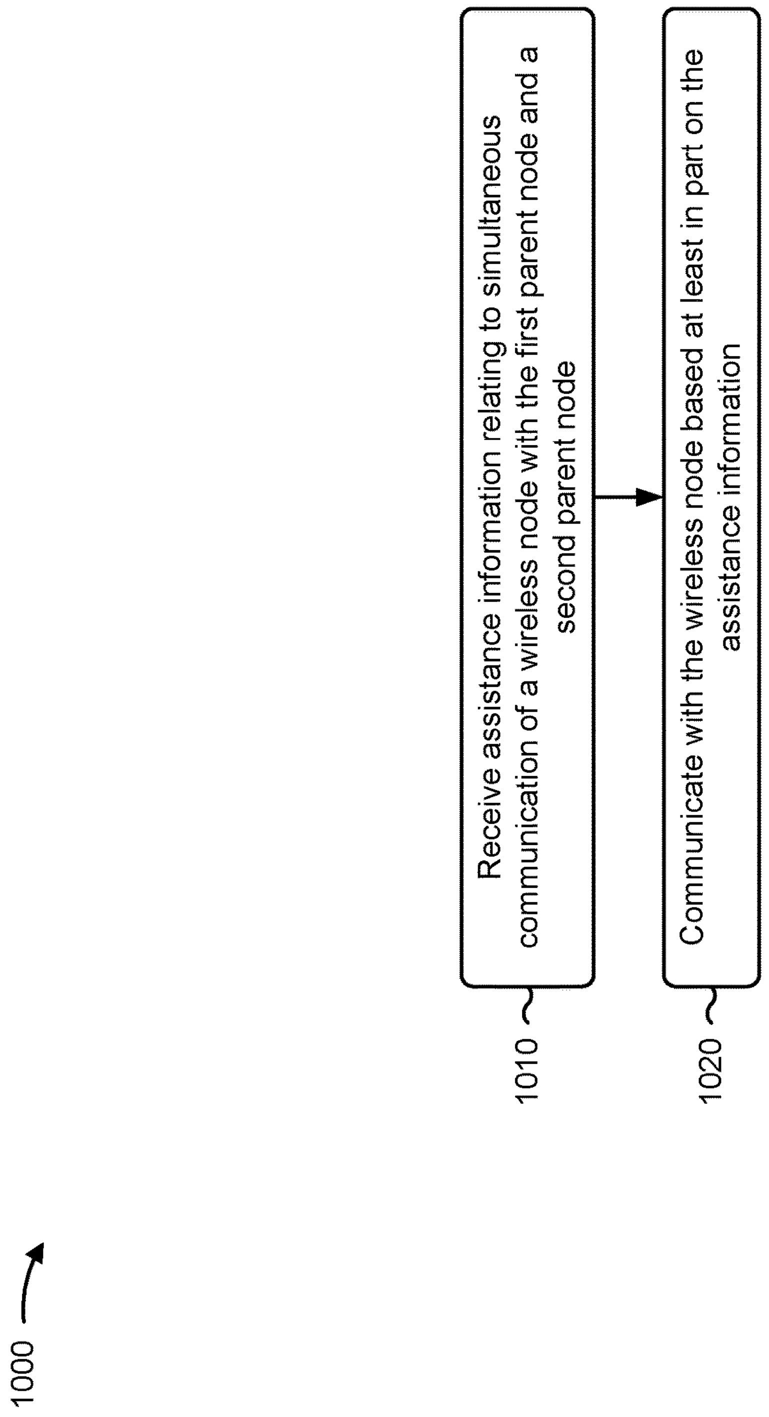

FIG. 10 is a diagram illustrating an example process 1000 performed, for example, by a first parent node, in accordance with the present disclosure. Example process 1000 is an example where the first parent node (e.g., first parent node 110*a*) performs operations associated with efficient simultaneous communication of a dual-connected wireless node.

As shown in FIG. 10, in some aspects, process 1000 may include receiving assistance information relating to simultaneous communication of a wireless node with the first parent node and a second parent node (block 1010). For example, the first parent node (e.g., using communication manager 1350 and/or reception component 1302, depicted in FIG. 13) may receive assistance information relating to simultaneous communication of a wireless node with the first parent node and a second parent node, as described above.

As further shown in FIG. 10, in some aspects, process 1000 may include communicating with the wireless node based at least in part on the assistance information (block 1020). For example, the first parent node (e.g., using communication manager 1350, reception component 1302, and/or transmission component 1304, depicted in FIG. 13) may communicate with the wireless node based at least in part on the assistance information, as described above.

Process 1000 may include additional aspects, such as any single aspect or any combination of aspects described below and/or in connection with one or more other processes described elsewhere herein.

In a first aspect, process 1000 includes receiving, from the wireless node, an indication of a capability of the wireless node for simultaneous communication with the first parent node and the second parent node, and transmitting the indication of the capability of the wireless node for simultaneous communication to the second parent node via an interface between a first central unit associated with the first parent node and a second central unit associated with the second parent node.

In a second aspect, alone or in combination with the first aspect, the indication includes an indication of a capability of the wireless node for simultaneous transmission and reception on multiple serving cells in a frequency band.

In a third aspect, alone or in combination with one or more of the first and second aspects, receiving the assistance information includes receiving the assistance information from at least one of the wireless node, the second parent node, or a central unit associated with the first parent node.

In a fourth aspect, alone or in combination with one or more of the first through third aspects, receiving the assistance information includes receiving, from the wireless node, an indication of at least one of a requested transmit beam or a requested receive beam for communication with the first parent node.

In a fifth aspect, alone or in combination with one or more of the first through fourth aspects, receiving the assistance information includes receiving, from the wireless node, an indication of at least one of a transmit beam or a receive beam not preferred for communication with the first parent node.

In a sixth aspect, alone or in combination with one or more of the first through fifth aspects, receiving the assistance information includes receiving, from the wireless node, an indication of at least one of one or more transmit beams or one or more receive beams that the wireless node is configured to use for communication with the second parent node.

In a seventh aspect, alone or in combination with one or more of the first through sixth aspects, receiving the assistance information includes receiving, from the wireless node, an indication of at least one of requested guard symbols or a requested guard band.

In an eighth aspect, alone or in combination with one or more of the first through seventh aspects, receiving the assistance information includes receiving, from the wireless node, an indication of at least one of guard symbols or a guard band provided by the second parent node.

In a ninth aspect, alone or in combination with one or more of the first through eighth aspects, receiving the assistance information includes receiving, from the wireless node, an indication of at least one of a requested downlink transmit power adjustment for the first parent node or a requested uplink transmit power for an uplink communication to the first parent node.

In a tenth aspect, alone or in combination with one or more of the first through ninth aspects, receiving the assistance information includes receiving, from the wireless node, an indication of at least one of a downlink receive power for a downlink communication from the second parent node, an uplink transmit power for an uplink communication to the second parent node, or a downlink transmit power adjustment for the second parent node.

In an eleventh aspect, alone or in combination with one or more of the first through tenth aspects, receiving the assistance information includes receiving, from the wireless node, an indication of at least one of a requested downlink transmit timing adjustment for the first parent node or a requested uplink transmit timing for an uplink communication to the first parent node.

In a twelfth aspect, alone or in combination with one or more of the first through eleventh aspects, receiving the assistance information includes receiving, from the wireless node, an indication of at least one of a downlink receive timing for a downlink communication from the second parent node or an uplink transmit timing for an uplink communication to the second parent node.

In a thirteenth aspect, alone or in combination with one or more of the first through twelfth aspects, receiving the assistance information includes receiving, from the wireless node, an indication of at least one of a requested downlink reference signal configuration or a requested uplink reference signal configuration associated with the first parent node.

In a fourteenth aspect, alone or in combination with one or more of the first through thirteenth aspects, receiving the assistance information includes receiving, from the wireless node, an indication of at least one of a downlink reference signal configuration or an uplink reference signal configuration associated with the second parent node.

In a fifteenth aspect, alone or in combination with one or more of the first through fourteenth aspects, the assistance information is associated with resources configured for simultaneous communication with the first parent node and the second parent node.

In a sixteenth aspect, alone or in combination with one or more of the first through fifteenth aspects, the assistance information is associated with a set of time and frequency resources.

In a seventeenth aspect, alone or in combination with one or more of the first through sixteenth aspects, the assistance information is associated with at least one of a resource type, a signal type, or a channel type.

In an eighteenth aspect, alone or in combination with one or more of the first through seventeenth aspects, receiving the assistance information includes receiving, from at least one of the second parent node, a central unit associated with the first parent node, or the wireless node, a recommended configuration for communication between the wireless node and the first parent node.

In a nineteenth aspect, alone or in combination with one or more of the first through eighteenth aspects, process 1000 includes transmitting, to at least one of the wireless node, the second parent node, or a central unit associated with the first parent node, a recommended configuration for communication between the wireless node and the second parent node based at least in part on receiving the assistance information.

In a twentieth aspect, alone or in combination with one or more of the first through nineteenth aspects, receiving the assistance information includes receiving, from at least one of the wireless node, the second parent node, or a central unit associated with the first parent node, an indication of a utilization, by the wireless node, of resources configured for a plurality of periodic or beam-swept communications associated with the second parent node.

In a twenty-first aspect, alone or in combination with one or more of the first through twentieth aspects, receiving the indication of the utilization of the resources configured for the plurality of periodic or beam-swept communications associated with the second parent node includes receiving a respective utilization indication for each resource of the resources configured for the plurality of periodic or beam-swept communications associated with the second parent node.

In a twenty-second aspect, alone or in combination with one or more of the first through twenty-first aspects, receiving the respective utilization indication for each resource of the resources configured for the plurality of periodic or beam-swept communications associated with the second parent node includes receiving, for each resource of the resources configured for the plurality of periodic or beam-swept communications associated with the second parent node, an indication of a respective index associated with that resource and the respective utilization indication for that resource.

In a twenty-third aspect, alone or in combination with one or more of the first through twenty-second aspects, the resources configured for the plurality of periodic or beam-swept communications associated with the second parent node include at least one of SSB resources, CSI-RS resources, SR resources, RACH resources, or SIB1 search space resources.

In a twenty-fourth aspect, alone or in combination with one or more of the first through twenty-third aspects, process 1000 includes transmitting, to the wireless node, a configuration for communication between the wireless node and the first parent node, wherein the configuration is based at least in part on the assistance information.

In a twenty-fifth aspect, alone or in combination with one or more of the first through twenty-fourth aspects, communicating with the wireless node based at least in part on the assistance information includes communicating with the wireless node based at least in part on the configuration while the wireless node simultaneously communicates with the second parent node.

In a twenty-sixth aspect, alone or in combination with one or more of the first through twenty-fifth aspects, the wireless node is an IAB-MT.

In a twenty-seventh aspect, alone or in combination with one or more of the first through twenty-sixth aspects, the wireless node is a UE.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
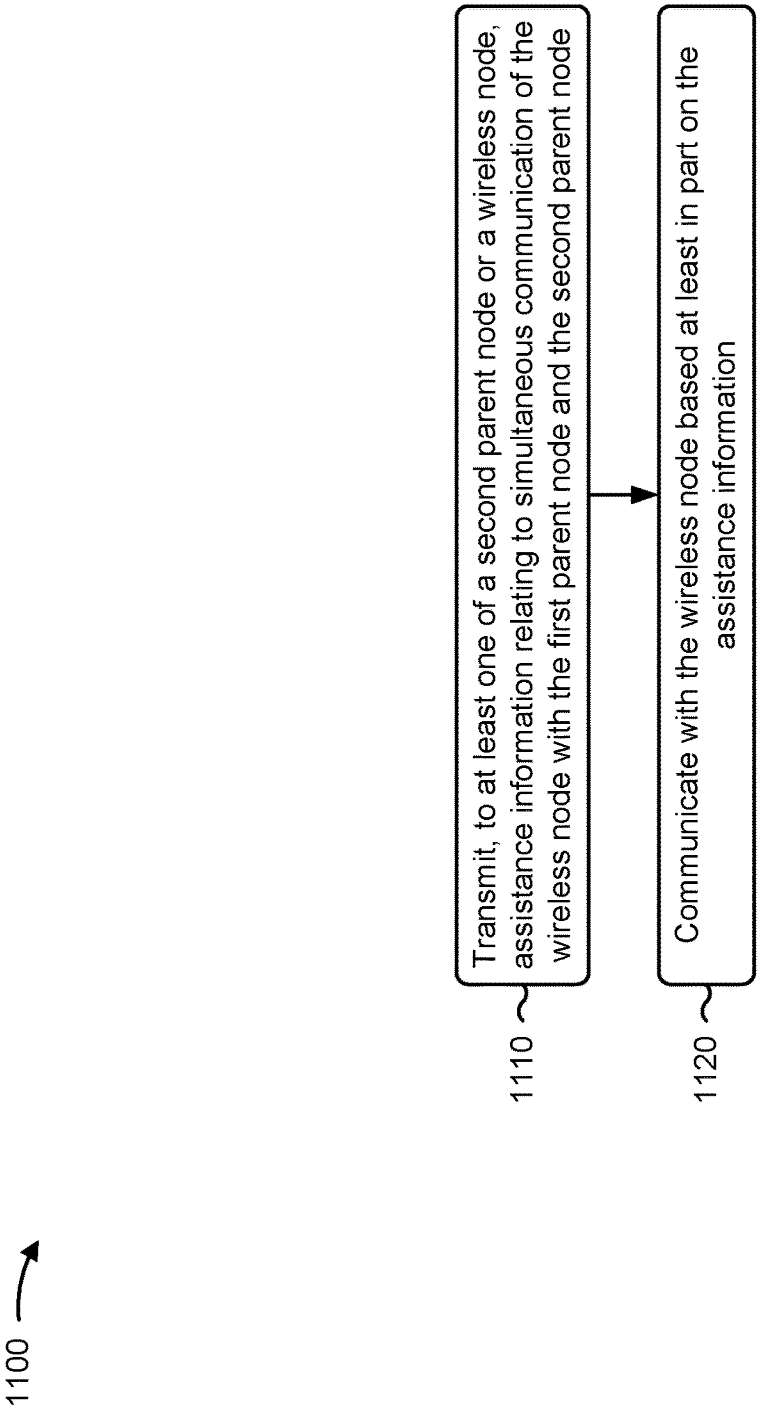

FIG. 11 is a diagram illustrating an example process 1100 performed, for example, by a first parent node, in accordance with the present disclosure. Example process 1100 is an example where the first parent node (e.g., first parent node 110*a*) performs operations associated with efficient simultaneous communication of a dual-connected wireless node.

As shown in FIG. 11, in some aspects, process 1100 may include transmitting, to at least one of a second parent node, a central unit, or a wireless node, assistance information relating to simultaneous communication of the wireless node with the first parent node and the second parent node (block 1110). For example, the first parent node (e.g., using communication manager 1350 and/or transmission component 1304, depicted in FIG. 13) may transmit, to at least one of a second parent node, a central unit, or a wireless node, assistance information relating to simultaneous communication of the wireless node with the first parent node and the second parent node, as described above.

As further shown in FIG. 11, in some aspects, process 1100 may include communicating with the wireless node based at least in part on the assistance information (block 1120). For example, the first parent node (e.g., using communication manager 1350, reception component 1302, and/or transmission component 1304, depicted in FIG. 13) may communicate with the wireless node based at least in part on the assistance information, as described above.

Process 1100 may include additional aspects, such as any single aspect or any combination of aspects described below and/or in connection with one or more other processes described elsewhere herein.

In a first aspect, transmitting the assistance information includes transmitting, to at least one of the wireless node, the second parent node, or the central unit associated with the first parent node, a recommended configuration for communication between the wireless node and the second parent node.

In a second aspect, alone or in combination with the first aspect, the recommended configuration for communication between the wireless node and the second parent node includes at least one of an indication of at least one of a transmit beam or receive beam for the wireless node to use for communication with the second parent node, an indication of at least one of guard symbols or guard bands for communication with the second parent node, an indication of an uplink transmit power for an uplink communication to the second parent node, an indication of an uplink transmit timing for an uplink communication to the second parent node, an indication of at least one of a downlink reference signal configuration or an uplink reference signal configuration, or an indication of a downlink transmit power for the second node.

In a third aspect, alone or in combination with one or more of the first and second aspects, the recommended configuration for communication between the wireless node and the second parent node includes one or more restrictions on a configuration for communication between the wireless node and the second parent node.

In a fourth aspect, alone or in combination with one or more of the first through third aspects, the recommended configuration for communication between the wireless node and the second parent node is associated with resources configured for simultaneous communication of the wireless node with the first parent node and the second parent node.

In a fifth aspect, alone or in combination with one or more of the first through fourth aspects, the recommended configuration for communication between the wireless node and the second parent node is associated with a set of time and frequency resources.

In a sixth aspect, alone or in combination with one or more of the first through fifth aspects, the recommended configuration for communication between the wireless node and the second parent node is associated with at least one of a resource type, a signal type, or a channel type.

In a seventh aspect, alone or in combination with one or more of the first through sixth aspects, communicating with the wireless node based at least in part on the assistance information includes communicating with the wireless node while the wireless node simultaneously communicates with the second parent node using a configuration based at least in part on the recommended configuration for communication between the wireless node and the second parent node.

In an eighth aspect, alone or in combination with one or more of the first through seventh aspects, transmitting the assistance information includes transmitting, to at least one of the second parent node or the central unit associated with the first parent node, an indication of a utilization, by the wireless node, of resources configured for a plurality of periodic or beam-swept communications associated with the first parent node.

In a ninth aspect, alone or in combination with one or more of the first through eighth aspects, transmitting the indication of the utilization of the resources configured for the plurality of periodic or beam-swept communications associated with the first parent node includes transmitting a respective utilization indication for each resource of the resources configured for the plurality of periodic or beam-swept communications associated with the first parent node.

In a tenth aspect, alone or in combination with one or more of the first through ninth aspects, the respective utilization indication for each resource is based at least in part on a comparison of a measured utilization of that resource over a time window and a threshold.

In an eleventh aspect, alone or in combination with one or more of the first through tenth aspects, transmitting the respective utilization indication for each resource of the resources configured for the plurality of periodic or beam-swept communications associated with the first parent node includes transmitting, for each resource of the resources configured for the plurality of periodic or beam-swept communications associated with the first parent node, an indication of a respective index associated with that resource and the respective utilization indication for that resource.

In a twelfth aspect, alone or in combination with one or more of the first through eleventh aspects, the resources configured for the plurality of periodic or beam-swept communications associated with the first parent node include at least one of SSB resources, CSI-RS resources, SR resources, RACH resources, or SIB1 search space resources.

In a thirteenth aspect, alone or in combination with one or more of the first through twelfth aspects, the wireless node is an IAB-MT.

In a fourteenth aspect, alone or in combination with one or more of the first through thirteenth aspects, the wireless node is a UE.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
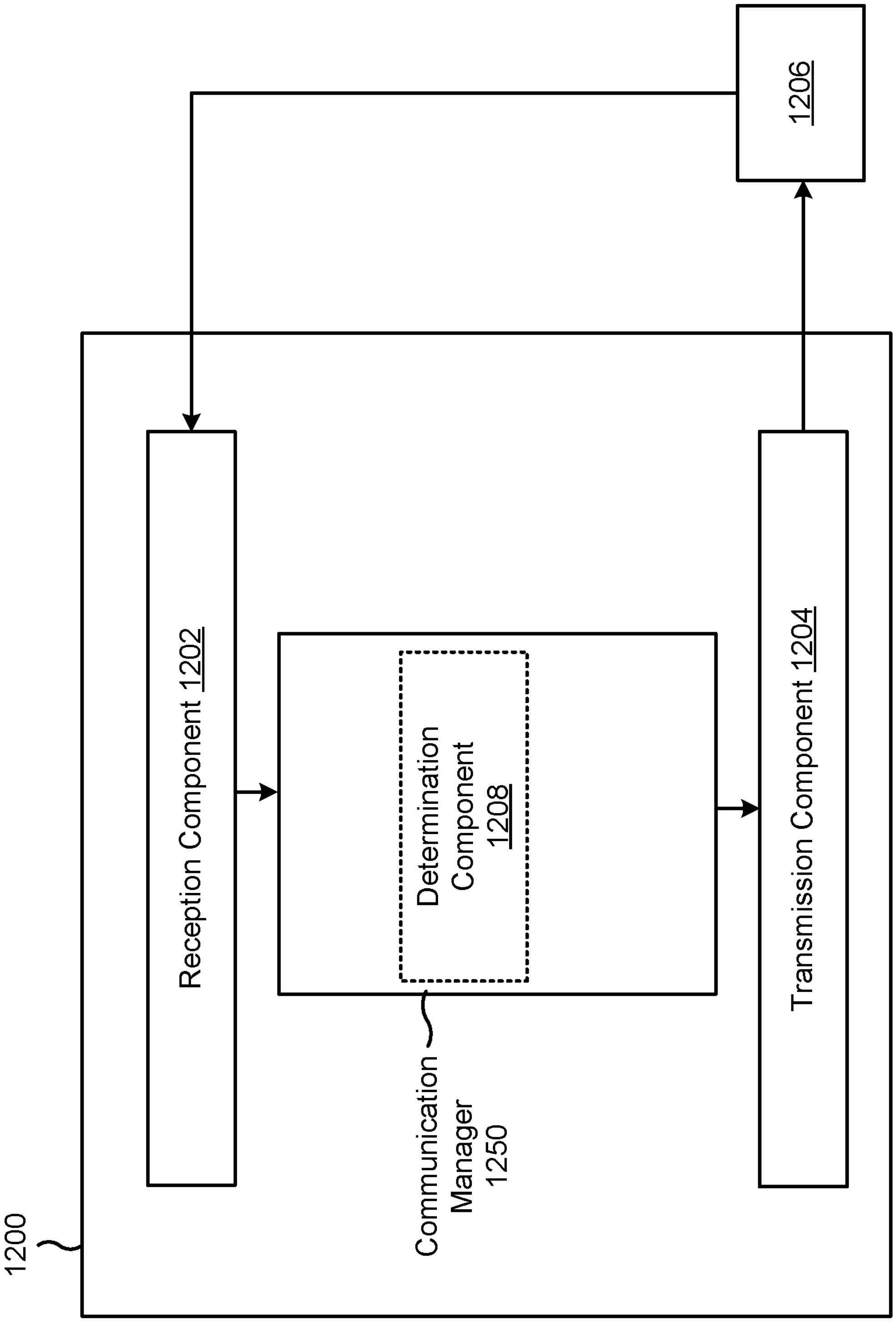
FIGS. 12-13 are diagrams of example apparatuses for wireless communication, in accordance with the present disclosure.

FIG. 12 is a diagram of an example apparatus 1200 for wireless communication. The apparatus 1200 may be a wireless node, or a wireless node may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204. As further shown, the apparatus 1200 may include the communication manager 1250. The communication manager 1250 may include a determination component 1208.

In some aspects, the apparatus 1200 may be configured to perform one or more operations described herein in connection with FIGS. 7-8. Additionally, or alternatively, the apparatus 1200 may be configured to perform one or more processes described herein, such as process 900 of FIG. 9, or a combination thereof. In some aspects, the apparatus 1200 and/or one or more components shown in FIG. 12 may include one or more components of the wireless node described in connection with FIG. 2. Additionally, or alternatively, one or more components shown in FIG. 12 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1200. In some aspects, the reception component 1202 may include one or more antennas, a modem, a demodulator, a MIMO detector, a receive processor, a controller/processor, a memory, or a combination thereof, of the wireless node described in connection with FIG. 2.

The transmission component 1204 may transmit communications, such as reference signals, control information, data communications, or a combination thereof, to the apparatus 1206. In some aspects, one or more other components of the apparatus 1200 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modem, a modulator, a transmit MIMO processor, a transmit processor, a controller/processor, a memory, or a combination thereof, of the wireless node described in connection with FIG. 2. In some aspects, the transmission component 1204 may be co-located with the reception component 1202 in a transceiver.

The transmission component 1204 may transmit, to at least one of a first parent node or a second parent node, assistance information relating to simultaneous communication of the wireless node with the first parent node and the second parent node. The reception component 1202 and/or the transmission component 1204 may communicate with at least one of the first parent node or the second parent node based at least in part on the assistance information. The determination component 1208 may determine the assistance information.

The transmission component 1204 may transmit, to at least one of the first parent node or the second parent node, an indication of a capability of the wireless node for simultaneous communication with the first parent node and the second parent node.

The reception component 1202 may receive, from the first parent node, a configuration for communication with the first parent node based at least in part on transmitting the assistance information to the first parent node.

The reception component 1202 may receive, from the first parent node, a recommended configuration for communication between the wireless node and the second parent node.

The transmission component 1204 may transmit, to the second parent node, the recommended configuration for communication between the wireless node and the second parent node.

The transmission component 1204 may transmit, to the first parent node, an indication of a utilization, by the wireless node, of resources configured for a plurality of periodic or beam-swept communications associated with the second parent node.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

Figure 13:
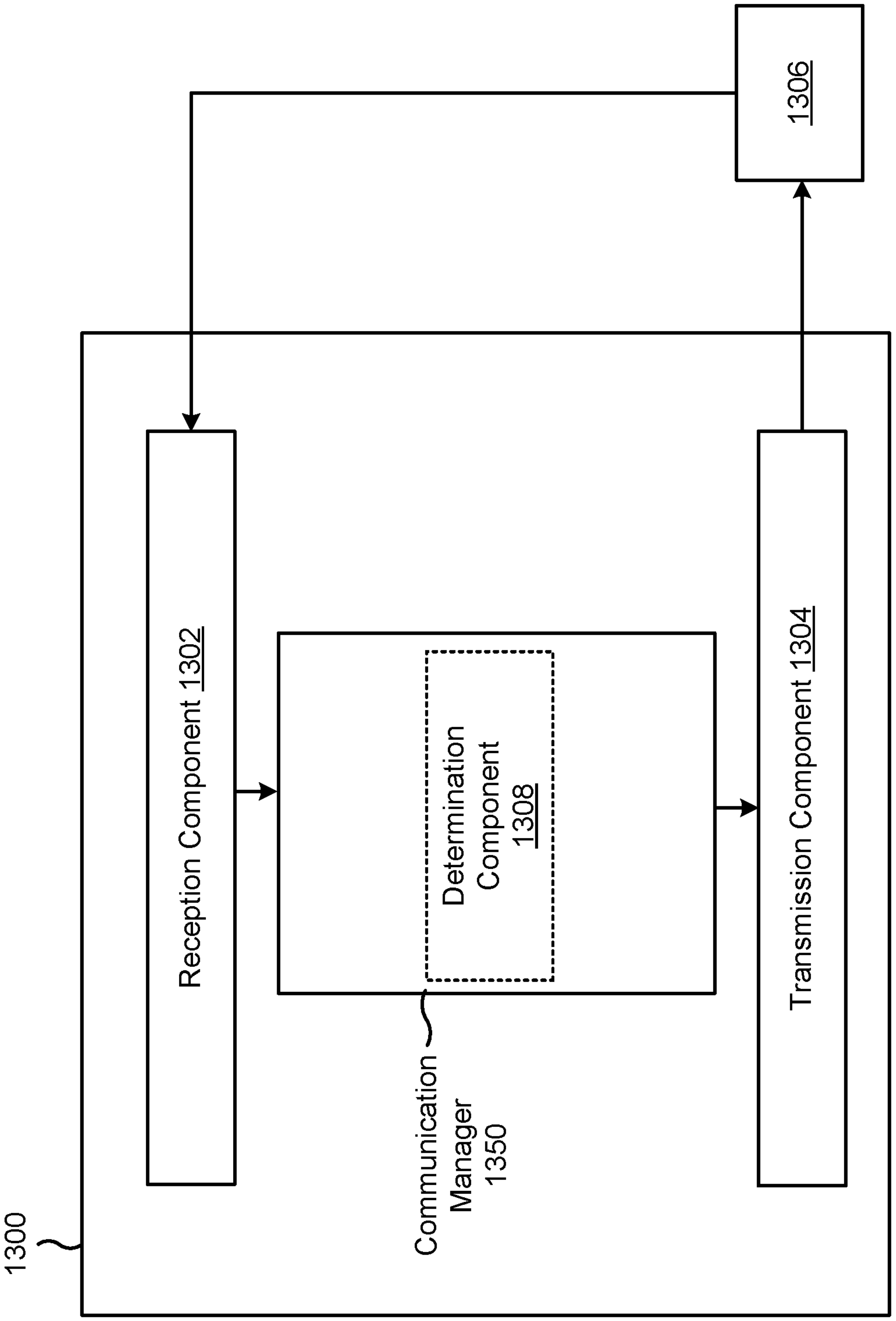

FIG. 13 is a diagram of an example apparatus 1300 for wireless communication. The apparatus 1300 may be a first parent node, or a first parent node may include the apparatus 1300. In some aspects, the apparatus 1300 includes a reception component 1302 and a transmission component 1304, which may be in communication with one another (for example, via one or more buses and/or one or more other components). As shown, the apparatus 1300 may communicate with another apparatus 1306 (such as a UE, a base station, or another wireless communication device) using the reception component 1302 and the transmission component 1304. As further shown, the apparatus 1300 may include the communication manager 1350. The communication manager 1350 may include a determination component 1308.

In some aspects, the apparatus 1300 may be configured to perform one or more operations described herein in connection with FIGS. 7-8. Additionally, or alternatively, the apparatus 1300 may be configured to perform one or more processes described herein, such as process 1000 of FIG. 10, process 1100 of FIG. 11, or a combination thereof. In some aspects, the apparatus 1300 and/or one or more components shown in FIG. 13 may include one or more components of the first parent node described in connection with FIG. 2. Additionally, or alternatively, one or more components shown in FIG. 13 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1306. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1300. In some aspects, the reception component 1302 may include one or more antennas, a modem, a demodulator, a MIMO detector, a receive processor, a controller/processor, a memory, or a combination thereof, of the first parent node described in connection with FIG. 2.

The transmission component 1304 may transmit communications, such as reference signals, control information, data communications, or a combination thereof, to the apparatus 1306. In some aspects, one or more other components of the apparatus 1300 may generate communications and may provide the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modem, a modulator, a transmit MIMO processor, a transmit processor, a controller/processor, a memory, or a combination thereof, of the first parent node described in connection with FIG. 2. In some aspects, the transmission component 1304 may be co-located with the reception component 1302 in a transceiver.

The reception component 1302 may receive assistance information relating to simultaneous communication of a wireless node with the first parent node and a second parent node. The reception component 1302 and/or the transmission component 1304 may communicate with the wireless node based at least in part on the assistance information.

The reception component 1302 may receive, from the wireless node, an indication of a capability of the wireless node for simultaneous communication with the first parent node and the second parent node.

The transmission component 1304 may transmit the indication of the capability of the wireless node for simultaneous communication to the second parent node via an interface between a first central unit associated with the first parent node and a second central unit associated with the second parent node.

The transmission component 1304 may transmit, to at least one of the wireless node, the second parent node, or a central unit associated with the first parent node, a recommended configuration for communication between the wireless node and the second parent node based at least in part on receiving the assistance information. The determination component 1308 may determine the recommended configuration for communication between the wireless node and the second parent node.

The transmission component 1304 may transmit, to the wireless node, a configuration for communication between the wireless node and the first parent node, wherein the configuration is based at least in part on the assistance information.

The transmission component 1304 may transmit, to at least one of a second parent node, a central unit, or a wireless node, assistance information relating to simultaneous communication of the wireless node with the first parent node and the second parent node. The reception component 1302 and/or the transmission component 1304 may communicate with the wireless node based at least in part on the assistance information.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

The following provides an overview of some Aspects of the present disclosure:

Aspect 1: A method of wireless communication performed by a wireless node, comprising: transmitting, to at least one of a first parent node or a second parent node, assistance information relating to simultaneous communication of the wireless node with the first parent node and the second parent node; and communicating with at least one of the first parent node or the second parent node based at least in part on the assistance information.

Aspect 2: The method of Aspect 1, further comprising: transmitting, to at least one of the first parent node or the second parent node, an indication of a capability of the wireless node for simultaneous communication with the first parent node and the second parent node.

Aspect 3: The method of Aspect 2, wherein the indication includes an indication of a capability of the wireless node for simultaneous transmission and reception on multiple serving cells in a frequency band.

Aspect 4: The method of any of Aspects 1-3, wherein transmitting the assistance information comprises: transmitting, to the first parent node, an indication of at least one of a requested transmit beam or a requested receive beam for communication with the first parent node.

Aspect 5: The method of any of Aspects 1-4, wherein transmitting the assistance information comprises: transmitting, to the first parent node, an indication of at least one of a transmit beam or a receive beam not preferred for communication with the first parent node.

Aspect 6: The method of any of Aspects 1-5, wherein transmitting the assistance information comprises: transmitting, to the first parent node, an indication of at least one of one or more transmit beams or one or more receive beams that the wireless node is configured to use for communication with the second parent node.

Aspect 7: The method of any of Aspects 1-6, wherein transmitting the assistance information comprises: transmitting, to the first parent node, an indication of at least one of requested guard symbols or a requested guard band.

Aspect 8: The method of any of Aspects 1-7, wherein transmitting the assistance information comprises: transmitting, to the first parent node, an indication of at least one of guard symbols or a guard band provided by the second parent node.

Aspect 9: The method of any of Aspects 1-8, wherein transmitting the assistance information comprises: transmitting, to the first parent node, an indication of at least one of a requested downlink transmit power adjustment for the first parent node or a requested uplink transmit power for an uplink communication to the first parent node.

Aspect 10: The method of any of Aspects 1-9, wherein transmitting the assistance information comprises: transmitting, to the first parent node, an indication of at least one of a downlink receive power for a downlink communication from the second parent node, an uplink transmit power for an uplink communication to the second parent node, or a downlink transmit power adjustment for the second parent node.

Aspect 11: The method of any of Aspects 1-10, wherein transmitting the assistance information comprises: transmitting, to the first parent node, an indication of at least one of a requested downlink transmit timing adjustment for the first parent node or a requested uplink transmit timing for an uplink communication to the first parent node.

Aspect 12: The method of any of Aspects 1-11, wherein transmitting the assistance information comprises: transmitting, to the first parent node, an indication of at least one of a downlink receive timing for a downlink communication from the second parent node or an uplink transmit timing for an uplink communication to the second parent node.

Aspect 13: The method of any of Aspects 1-12, wherein transmitting the assistance information comprises: transmitting, to the first parent node, an indication of at least one of a requested downlink reference signal configuration or a requested uplink reference signal configuration associated with the first parent node.

Aspect 14: The method of any of Aspects 1-13, wherein transmitting the assistance information comprises: transmitting, to the first parent node, an indication of at least one of a downlink reference signal configuration or an uplink reference signal configuration associated with the second parent node.

Aspect 15: The method of any of Aspects 1-14, wherein the assistance information is associated with resources configured for simultaneous communication with the first parent node and the second parent node.

Aspect 16: The method of any of Aspects 1-15, wherein the assistance information is associated with a set of time and frequency resources.

Aspect 17: The method of any of Aspects 1-16, wherein transmitting the assistance information comprises: transmitting the assistance information to the first parent node, wherein the first parent node is a secondary node and the second parent node is a master node.

Aspect 18: The method of any of Aspects 1-17, wherein the assistance information is associated with at least one of a resource type, a signal type, or a channel type.

Aspect 19: The method of any of Aspects 1-18, further comprising: receiving, from the first parent node, a configuration for communication with the first parent node based at least in part on transmitting the assistance information to the first parent node.

Aspect 20: The method of any of Aspects 1-19, further comprising: receiving, from the first parent node, a recommended configuration for communication between the wireless node and the second parent node.

Aspect 21: The method of Aspect 20, wherein transmitting the assistance information comprises: transmitting the assistance information to the second parent node, wherein the assistance information is based at least in part on the recommended configuration for communication between the wireless node and the second parent node.

Aspect 22: The method of any of Aspects 20-21, wherein transmitting the assistance information comprises: transmitting, to the second parent node, the recommended configuration for communication between the wireless node and the second parent node.

Aspect 23: The method of any of Aspects 20-22, wherein transmitting the assistance information comprises transmitting the assistance information to the first parent node, and wherein receiving, from the first parent node, the recommended configuration for communication between the wireless node and the second parent node is based at least in part on transmitting the assistance information to the first parent node.

Aspect 24: The method of Aspect 23, further comprising: transmitting, to the second parent node, the recommended configuration for communication between the wireless node and the second parent node.

Aspect 25: The method of any of Aspects 20-24, wherein the recommended configuration for communication between the wireless node and the second parent node includes at least one of: an indication of at least one of a transmit beam or receive beam for the wireless node to use for communication with the second parent node, an indication of at least one of guard symbols or guard bands for communication with the second parent node, an indication of an uplink transmit power for an uplink communication to the second parent node, an indication of an uplink transmit timing for an uplink communication to the second parent node, an indication of at least one of a downlink reference signal configuration or an uplink reference signal configuration, or an indication of a downlink transmit power for the second parent node.

Aspect 26: The method of any of Aspects 20-25, wherein the recommended configuration for communication between the wireless node and the second parent node is associated with resources configured for simultaneous communication with the first parent node and the second parent node.

Aspect 27: The method of any of Aspects 20-26, wherein the recommended configuration for communication between the wireless node and the second parent node is associated with a set of time and frequency resources.

Aspect 28: The method of any of Aspects 20-27, wherein the recommended configuration for communication between the wireless node and the second parent node is associated with at least one of a resource type, a signal type, or a channel type.

Aspect 29: The method of any of Aspects 1-28, wherein transmitting the assistance information comprises: transmitting, to the first parent node, an indication of a utilization, by the wireless node, of resources configured for a plurality of periodic or beam-swept communications associated with the second parent node.

Aspect 30: The method of Aspect 29, wherein transmitting the indication of the utilization of the resources configured for the plurality of periodic or beam-swept communications associated with the second parent node comprises: transmitting a respective utilization indication for each resource of the resources configured for the plurality of periodic or beam-swept communications associated with the second parent node.

Aspect 31: The method of Aspect 30, wherein the respective utilization indication for each resource is based at least in part on a comparison of a measured utilization of that resource over a time window and a threshold.

Aspect 32: The method of any of Aspects 30-31, wherein transmitting the respective utilization indication for each resource of the resources configured for the plurality of periodic or beam-swept communications associated with the second parent node comprises: transmitting, for each resource of the resources configured for the plurality of periodic or beam-swept communications associated with the second parent node, an indication of a respective index associated with that resource and the respective utilization indication for that resource.

Aspect 33: The method of any of Aspects 29-32, wherein the resources configured for the plurality of periodic or beam-swept communications associated with the second parent node include at least one of synchronization signal block (SSB) resources, channel state information reference signal (CSI-RS) resources, scheduling request (SR) resources, random access channel (RACH) resources, or system information block type 1 (SIB1) search space resources.

Aspect 34: The method of any of Aspects 1-33, wherein communicating with at least one of the first parent node or the second parent node comprises: communicating with the first parent node and the second parent node simultaneously based at least in part on the assistance information.

Aspect 35: The method of any of Aspects 1-34, wherein the wireless node is an integrated access and backhaul (IAB) mobile termination (IAB-MT).

Aspect 36: The method of any of Aspects 1-34, wherein the wireless node is a user equipment (UE).

Aspect 37: A method of wireless communication performed by a first parent node, comprising: receiving assistance information relating to simultaneous communication of a wireless node with the first parent node and a second parent node; and communicating with the wireless node based at least in part on the assistance information.

Aspect 38: The method of Aspect 37, further comprising: receiving, from the wireless node, an indication of a capability of the wireless node for simultaneous communication with the first parent node and the second parent node; and transmitting the indication of the capability of the wireless node for simultaneous communication to the second parent node via an interface between a first central unit associated with the first parent node and a second central unit associated with the second parent node.

Aspect 39: The method of Aspect 38, wherein the indication includes an indication of a capability of the wireless node for simultaneous transmission and reception on multiple serving cells in a frequency band.

Aspect 40: The method of any of Aspects 37-39, wherein receiving the assistance information comprises: receiving the assistance information from at least one of the wireless node, the second parent node, or a central unit associated with the first parent node.

Aspect 41: The method of any of Aspects 37-40, wherein receiving the assistance information comprises: receiving, from the wireless node, an indication of at least one of a requested transmit beam or a requested receive beam for communication with the first parent node.

Aspect 42: The method of any of Aspects 37-41, wherein receiving the assistance information comprises: receiving, from the wireless node, an indication of at least one of a transmit beam or a receive beam not preferred for communication with the first parent node.

Aspect 43: The method of any of Aspects 37-42, wherein receiving the assistance information comprises: receiving, from the wireless node, an indication of at least one of one or more transmit beams or one or more receive beams that the wireless node is configured to use for communication with the second parent node.

Aspect 44: The method of any of Aspects 37-43, wherein receiving the assistance information comprises: receiving, from the wireless node, an indication of at least one of requested guard symbols or a requested guard band.

Aspect 45: The method of any of Aspects 37-44, wherein receiving the assistance information comprises: receiving, from the wireless node, an indication of at least one of guard symbols or a guard band provided by the second parent node.

Aspect 46: The method of any of Aspects 37-45, wherein receiving the assistance information comprises: receiving, from the wireless node, an indication of at least one of a requested downlink transmit power adjustment for the first parent node or a requested uplink transmit power for an uplink communication to the first parent node.

Aspect 47: The method of any of Aspects 37-46, wherein receiving the assistance information comprises: receiving, from the wireless node, an indication of at least one of a downlink receive power for a downlink communication from the second parent node, an uplink transmit power for an uplink communication to the second parent node, or a downlink transmit power adjustment for the second parent node.

Aspect 48: The method of any of Aspects 37-47, wherein receiving the assistance information comprises: receiving, from the wireless node, an indication of at least one of a requested downlink transmit timing adjustment for the first parent node or a requested uplink transmit timing for an uplink communication to the first parent node.

Aspect 49: The method of any of Aspects 37-48, wherein receiving the assistance information comprises: receiving, from the wireless node, an indication of at least one of a downlink receive timing for a downlink communication from the second parent node or an uplink transmit timing for an uplink communication to the second parent node.

Aspect 50: The method of any of Aspects 37-49, wherein receiving the assistance information comprises: receiving, from the wireless node, an indication of at least one of a requested downlink reference signal configuration or a requested uplink reference signal configuration associated with the first parent node.

Aspect 51: The method of any of Aspects 37-50, wherein receiving the assistance information comprises: receiving, from the wireless node, an indication of at least one of a downlink reference signal configuration or an uplink reference signal configuration associated with the second parent node.

Aspect 52: The method of any of Aspects 37-51, wherein the assistance information is associated with resources configured for simultaneous communication with the first parent node and the second parent node.

Aspect 53: The method of any of Aspects 37-52, wherein the assistance information is associated with a set of time and frequency resources.

Aspect 54: The method of any of Aspects 37-53, wherein the assistance information is associated with at least one of a resource type, a signal type, or a channel type.

Aspect 55: The method of any of Aspects 37-54, wherein receiving the assistance information comprises: receiving, from at least one of the second parent node, a central unit associated with the first parent node, or the wireless node, a recommended configuration for communication between the wireless node and the first parent node.

Aspect 56: The method of any of Aspects 37-54, further comprising: transmitting, to at least one of the wireless node, the second parent node, or a central unit associated with the first parent node, a recommended configuration for communication between the wireless node and the second parent node based at least in part on receiving the assistance information.

Aspect 57: The method of any of Aspects 37-56, wherein receiving the assistance information comprises: receiving, from at least one of the wireless node, the second parent node, or a central unit associated with the first parent node, an indication of a utilization, by the wireless node, of resources configured for a plurality of periodic or beam-swept communications associated with the second parent node.

Aspect 58: The method of Aspect 57, wherein receiving the indication of the utilization of the resources configured for the plurality of periodic or beam-swept communications associated with the second parent node comprises: receiving a respective utilization indication for each resource of the resources configured for the plurality of periodic or beam-swept communications associated with the second parent node.

Aspect 59: The method of Aspect 58, wherein receiving the respective utilization indication for each resource of the resources configured for the plurality of periodic or beam-swept communications associated with the second parent node comprises: receiving, for each resource of the resources configured for the plurality of periodic or beam-swept communications associated with the second parent node, an indication of a respective index associated with that resource and the respective utilization indication for that resource.

Aspect 60: The method of any of Aspects 57-59, wherein the resources configured for the plurality of periodic or beam-swept communications associated with the second parent node include at least one of synchronization signal block (SSB) resources, channel state information reference signal (CSI-RS) resources, scheduling request (SR) resources, random access channel (RACH) resources, or system information block type 1 (SIB1) search space resources.

Aspect 61: The method of any of Aspects 37-60, further comprising: transmitting, to the wireless node, a configuration for communication between the wireless node and the first parent node, wherein the configuration is based at least in part on the assistance information.

Aspect 62: The method of Aspect 61, wherein communicating with the wireless node based at least in part on the assistance information comprises: communicating with the wireless node based at least in part on the configuration while the wireless node simultaneously communicates with the second parent node.

Aspect 63: The method of any of Aspects 37-62, wherein the wireless node is an integrated access and backhaul (IAB) mobile termination (IAB-MT).

Aspect 64: The method of any of Aspects 37-62, wherein the wireless node is a user equipment (UE).

Aspect 65: A method of wireless communication performed by a first parent node, comprising: transmitting, to at least one of a second parent node, a central unit, or a wireless node, assistance information relating to simultaneous communication of the wireless node with the first parent node and the second parent node; and communicating with the wireless node based at least in part on the assistance information.

Aspect 66: The method of Aspect 65, wherein transmitting the assistance information comprises: transmitting, to at least one of the wireless node, the second parent node, or the central unit associated with the first parent node, a recommended configuration for communication between the wireless node and the second parent node.

Aspect 67: The method of Aspect 66, wherein the recommended configuration for communication between the wireless node and the second parent node includes at least one of: an indication of at least one of a transmit beam or receive beam for the wireless node to use for communication with the second parent node, an indication of at least one of guard symbols or guard bands for communication with the second parent node, an indication of an uplink transmit power for an uplink communication to the second parent node, an indication of an uplink transmit timing for an uplink communication to the second parent node, an indication of at least one of a downlink reference signal configuration or an uplink reference signal configuration, or an indication of a downlink transmit power for the second node.

Aspect 68: The method of any of Aspects 66-67, wherein the recommended configuration for communication between the wireless node and the second parent node includes one or more restrictions on a configuration for communication between the wireless node and the second parent node.

Aspect 69: The method of any of Aspects 66-68, wherein the recommended configuration for communication between the wireless node and the second parent node is associated with resources configured for simultaneous communication of the wireless node with the first parent node and the second parent node.

Aspect 70: The method of any of Aspects 66-69, wherein the recommended configuration for communication between the wireless node and the second parent node is associated with a set of time and frequency resources.

Aspect 71: The method of any of Aspects 66-70, wherein the recommended configuration for communication between the wireless node and the second parent node is associated with at least one of a resource type, a signal type, or a channel type.

Aspect 72: The method of any of Aspects 66-71, wherein communicating with the wireless node based at least in part on the assistance information comprises: communicating with the wireless node while the wireless node simultaneously communicates with the second parent node using a configuration based at least in part on the recommended configuration for communication between the wireless node and the second parent node.

Aspect 73: The method of any of Aspects 65-72, wherein transmitting the assistance information comprises: transmitting, to at least one of the second parent node or the central unit associated with the first parent node, an indication of a utilization, by the wireless node, of resources configured for a plurality of periodic or beam-swept communications associated with the first parent node.

Aspect 74: The method of Aspect 73, wherein transmitting the indication of the utilization of the resources configured for the plurality of periodic or beam-swept communications associated with the first parent node comprises: transmitting a respective utilization indication for each resource of the resources configured for the plurality of periodic or beam-swept communications associated with the first parent node.

Aspect 75: The method of Aspect 74, wherein the respective utilization indication for each resource is based at least in part on a comparison of a measured utilization of that resource over a time window and a threshold.

Aspect 76: The method of any of Aspects 74-75, wherein transmitting the respective utilization indication for each resource of the resources configured for the plurality of periodic or beam-swept communications associated with the first parent node comprises: transmitting, for each resource of the resources configured for the plurality of periodic or beam-swept communications associated with the first parent node, an indication of a respective index associated with that resource and the respective utilization indication for that resource.

Aspect 77: The method of any of Aspects 73-76, wherein the resources configured for the plurality of periodic or beam-swept communications associated with the first parent node include at least one of synchronization signal block (SSB) resources, channel state information reference signal (CSI-RS) resources, scheduling request (SR) resources, random access channel (RACH) resources, or system information block type 1 (SIB1) search space resources.

Aspect 78: The method of any of Aspects 65-77, wherein the wireless node is an integrated access and backhaul (IAB) mobile termination (IAB-MT).

Aspect 79: The method of any of Aspects 65-77, wherein the wireless node is a user equipment (UE).

Aspect 80: An apparatus for wireless communication at a device, comprising a processor; memory coupled with the processor; and instructions stored in the memory and executable by the processor to cause the apparatus to perform the method of one or more of Aspects 1-36.

Aspect 81: A device for wireless communication, comprising a memory and one or more processors coupled to the memory, the one or more processors configured to perform the method of one or more of Aspects 1-36.

Aspect 82: An apparatus for wireless communication, comprising at least one means for performing the method of one or more of Aspects 1-36.

Aspect 83: A non-transitory computer-readable medium storing code for wireless communication, the code comprising instructions executable by a processor to perform the method of one or more of Aspects 1-36.

Aspect 84: A non-transitory computer-readable medium storing a set of instructions for wireless communication, the set of instructions comprising one or more instructions that, when executed by one or more processors of a device, cause the device to perform the method of one or more of Aspects 1-36.

Aspect 85: An apparatus for wireless communication at a device, comprising a processor; memory coupled with the processor; and instructions stored in the memory and executable by the processor to cause the apparatus to perform the method of one or more of Aspects 37-64.

Aspect 86: A device for wireless communication, comprising a memory and one or more processors coupled to the memory, the one or more processors configured to perform the method of one or more of Aspects 37-64.

Aspect 87: An apparatus for wireless communication, comprising at least one means for performing the method of one or more of Aspects 37-64.

Aspect 88: A non-transitory computer-readable medium storing code for wireless communication, the code comprising instructions executable by a processor to perform the method of one or more of Aspects 37-64.

Aspect 89: A non-transitory computer-readable medium storing a set of instructions for wireless communication, the set of instructions comprising one or more instructions that, when executed by one or more processors of a device, cause the device to perform the method of one or more of Aspects 37-64.

Aspect 90: An apparatus for wireless communication at a device, comprising a processor; memory coupled with the processor; and instructions stored in the memory and executable by the processor to cause the apparatus to perform the method of one or more of Aspects 65-79.

Aspect 91: A device for wireless communication, comprising a memory and one or more processors coupled to the memory, the one or more processors configured to perform the method of one or more of Aspects 65-79.

Aspect 92: An apparatus for wireless communication, comprising at least one means for performing the method of one or more of Aspects 65-79.

Aspect 93: A non-transitory computer-readable medium storing code for wireless communication, the code comprising instructions executable by a processor to perform the method of one or more of Aspects 65-79.

Aspect 94: A non-transitory computer-readable medium storing a set of instructions for wireless communication, the set of instructions comprising one or more instructions that, when executed by one or more processors of a device, cause the device to perform the method of one or more of Aspects 65-79.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A wireless node for wireless communication, comprising:

one or more memories; and one or more processors, coupled to the one or more memories, individually or collectively configured to cause the wireless node to:

transmit, to a first parent node, assistance information relating to simultaneous communication of the wireless node with the first parent node and a second parent node, wherein the assistance information comprises:

a request for first configuration information for communication between the wireless node and the first parent node, and second configuration information for communication between the wireless node and the second parent node;

wherein the second configuration information includes an indication of a utilization of resources configured for the communication between the wireless node and the second parent node; and wherein the request for the first configuration information includes a request for scheduling of the communication between the wireless node and the first parent node in the resources; and communicate, in the resources, with at least one of the first parent node or the second parent node based at least in part on the assistance information.

2. The wireless node of claim 1, wherein the one or more processors are individually or collectively configured to cause the wireless node to:

transmit, to the first parent node, an indication of a capability of the wireless node for simultaneous communication with the first parent node and the second parent node in the resources, wherein the indication includes an indication of a capability of the wireless node for simultaneous transmission and reception on multiple serving cells in a frequency band.

3. The wireless node of claim 1, wherein, to transmit the assistance information, the one or more processors are individually or collectively configured to cause the wireless node to: transmit, to the first parent node, at least one of: an indication of at least one of a requested transmit beam or a requested receive beam for communication with the first parent node, an indication of at least one of a transmit beam or a receive beam not preferred for communication with the first parent node, or an indication of at least one of one or more transmit beams or one or more receive beams that the wireless node is configured to use for communication with the second parent node.

4. The wireless node of claim 1, wherein, to transmit the assistance information, the one or more processors are individually or collectively configured to cause the wireless node to: transmit, to the first parent node, at least one of: an indication of at least one of requested guard symbols or a requested guard band, or an indication of at least one of guard symbols or a guard band provided by the second parent node.

5. The wireless node of claim 1, wherein, to transmit the assistance information, the one or more processors are individually or collectively configured to cause the wireless node to: transmit, to the first parent node, at least one of: an indication of at least one of a requested downlink transmit power adjustment for the first parent node or a requested uplink transmit power for an uplink communication to the first parent node, or an indication of at least one of a downlink receive power for a downlink communication from the second parent node, an uplink transmit power for an uplink communication to the second parent node, or a downlink transmit power adjustment for the second parent node.

6. The wireless node of claim 1, wherein, to transmit the assistance information, the one or more processors are individually or collectively configured to cause the wireless node to: transmit, to the first parent node, at least one of: an indication of at least one of a requested downlink transmit timing adjustment for the first parent node or a requested uplink transmit timing for an uplink communication to the first parent node, or an indication of at least one of a downlink receive timing for a downlink communication from the second parent node or an uplink transmit timing for an uplink communication to the second parent node.

7. The wireless node of claim 1, wherein, to transmit the assistance information, the one or more processors are individually or collectively configured to cause the wireless node to: transmit, to the first parent node, at least one of: an indication of at least one of a requested downlink reference signal configuration or a requested uplink reference signal configuration associated with the first parent node, or an indication of at least one of a downlink reference signal configuration or an uplink reference signal configuration associated with the second parent node.

8. The wireless node of claim 1, wherein: the assistance information is associated with a set of time and frequency resources, or the assistance information is associated with at least one of a resource type, a signal type, or a channel type.

9. The wireless node of claim 1, wherein: the first parent node is a secondary node, and the second parent node is a master node.

10. The wireless node of claim 1, wherein the one or more processors are individually or collectively configured to cause the wireless node to: receive, from the first parent node, a configuration for communication with the first parent node based at least in part on transmitting the assistance information to the first parent node.

11. The wireless node of claim 1, wherein the one or more processors are individually or collectively configured to cause the wireless node to: receive, from the first parent node, a recommended configuration for communication between the wireless node and the second parent node.

12. The wireless node of claim 11, wherein the one or more processors are individually or collectively configured to cause the wireless node to: transmit the assistance information to the second parent node, wherein the assistance information is based at least in part on the recommended configuration for communication between the wireless node and the second parent node.

13. The wireless node of claim 11, wherein the one or more processors are individually or collectively configured to cause the wireless node to receive, from the first parent node, the recommended configuration for communication between the wireless node and the second parent node based at least in part on transmitting the assistance information to the first parent node.

14. The wireless node of claim 13, wherein the one or more processors are individually or collectively configured to cause the wireless node to: transmit, to the second parent node, the recommended configuration for communication between the wireless node and the second parent node.

15. The wireless node of claim 11, wherein the recommended configuration for communication between the wireless node and the second parent node includes at least one of: an indication of at least one of a transmit beam or receive beam for the wireless node to use for communication with the second parent node, an indication of at least one of guard symbols or guard bands for communication with the second parent node, an indication of an uplink transmit power for an uplink communication to the second parent node, an indication of an uplink transmit timing for an uplink communication to the second parent node, an indication of at least one of a downlink reference signal configuration or an uplink reference signal configuration, or an indication of a downlink transmit power for the second parent node.

16. The wireless node of claim 11, wherein the recommended configuration for communication between the wireless node and the second parent node is associated with resources configured for simultaneous communication with the first parent node and the second parent node, and wherein:

the recommended configuration for communication between the wireless node and the second parent node is associated with a set of time and frequency resources, or the recommended configuration for communication between the wireless node and the second parent node is associated with at least one of a resource type, a signal type, or a channel type.

17. The wireless node of claim 1, wherein the second configuration information indicates resources configured for a plurality of periodic or beam-swept communications associated with the second parent node.

18. The wireless node of claim 1, wherein the one or more processors are individually or collectively configured to cause the wireless node to:

communicate with the first parent node and the second parent node simultaneously based at least in part on the assistance information.

19. The wireless node of claim 1, wherein the wireless node is an integrated access and backhaul (IAB) mobile termination (IAB-MT).

20. The wireless node of claim 1, wherein the wireless node is a user equipment (UE).

21. A first parent node for wireless communication, comprising:

one or more memories; and one or more processors, coupled to the one or more memories, individually or collectively configured to cause the first parent node to:

receive assistance information relating to simultaneous communication of a wireless node with the first parent node and a second parent node, wherein the assistance information comprises:

a request for first configuration information for communication between the wireless node and the first parent node, and second configuration information for communication between the wireless node and the second parent node;

wherein the second configuration information includes an indication of a utilization of resources configured for the communication between the wireless node and the second parent node; and wherein the request for the first configuration information includes a request for scheduling of the communication between the wireless node and the first parent node in the resources; and communicate with the wireless node in the resources based at least in part on the assistance information.

22. The first parent node of claim 21, wherein the one or more processors are individually or collectively configured to cause the first parent node to:

receive, from the wireless node, an indication of a capability of the wireless node for simultaneous communication with the first parent node and the second parent node in the resources, wherein the indication includes an indication of a capability of the wireless node for simultaneous transmission and reception on multiple serving cells in a frequency band; and transmit the indication of the capability of the wireless node for simultaneous communication to the second parent node via an interface between a first central unit associated with the first parent node and a second central unit associated with the second parent node.

23. The first parent node of claim 21, wherein, to receive the assistance information, the one or more processors are individually or collectively configured to cause the first parent node to:

receive the assistance information from at least one of the wireless node, the second parent node, or a central unit associated with the first parent node.

24. The first parent node of claim 21, wherein, to receive the assistance information, the one or more processors are individually or collectively configured to cause the first parent node to receive, from the wireless node, at least one of:

an indication of at least one of a requested transmit beam or a requested receive beam for communication with the first parent node, an indication of at least one of a transmit beam or a receive beam not preferred for communication with the first parent node, an indication of at least one of one or more transmit beams or one or more receive beams that the wireless node is configured to use for communication with the second parent node, an indication of at least one of requested guard symbols or a requested guard band, an indication of at least one of guard symbols or a guard band provided by the second parent node, an indication of at least one of a requested downlink transmit power adjustment for the first parent node or a requested uplink transmit power for an uplink communication to the first parent node, an indication of at least one of a downlink receive power for a downlink communication from the second parent node, an uplink transmit power for an uplink communication to the second parent node, or a downlink transmit power adjustment for the second parent node, an indication of at least one of a requested downlink transmit timing adjustment for the first parent node or a requested uplink transmit timing for an uplink communication to the first parent node, an indication of at least one of a downlink receive timing for a downlink communication from the second parent node or an uplink transmit timing for an uplink communication to the second parent node, an indication of at least one of a requested downlink reference signal configuration or a requested uplink reference signal configuration associated with the first parent node, or an indication of at least one of a downlink reference signal configuration or an uplink reference signal configuration associated with the second parent node.

25. The first parent node of claim 21, wherein the one or more processors are individually or collectively configured to cause the first parent node to:

receive, from at least one of the second parent node, a central unit associated with the first parent node, or the wireless node, a recommended configuration for communication between the wireless node and the first parent node.

26. The first parent node of claim 21, wherein the one or more processors are individually or collectively configured to cause the first parent node to:

transmit, to at least one of the wireless node, the second parent node, or a central unit associated with the first parent node, a recommended configuration for communication between the wireless node and the second parent node based at least in part on the assistance information.

27. The first parent node of claim 21, wherein the second configuration information indicates resources configured for a plurality of periodic or beam-swept communications associated with the second parent node.

28. The first parent node of claim 21, wherein the one or more processors are individually or collectively configured to cause the first parent node to: transmit, to the wireless node, a configuration for communication between the wireless node and the first parent node, wherein the configuration is based at least in part on the assistance information.

29. A method of wireless communication performed by a wireless node, comprising:

transmitting, to a first parent node, assistance information relating to simultaneous communication of the wireless node with the first parent node and a second parent node, wherein the assistance information comprises:

a request for first configuration information for communication between the wireless node and the first parent node, and second configuration information for communication between the wireless node and the second parent node;

wherein the second configuration information includes an indication of a utilization of resources configured for the communication between the wireless node and the second parent node; and wherein the request for the first configuration information includes a request for scheduling of the communication between the wireless node and the first parent node in the resources; and communicating, in the resources, with at least one of the first parent node or the second parent node based at least in part on the assistance information.

30. A method of wireless communication performed by a first parent node, comprising:

receiving assistance information relating to simultaneous communication of a wireless node with the first parent node and a second parent node, wherein the assistance information comprises:

a request for first configuration information for communication between the wireless node and the first parent node, and second configuration information for communication between the wireless node and the second parent node;

wherein the second configuration information includes an indication of a utilization of resources configured for the communication between the wireless node and the second parent node; and wherein the request for the first configuration information includes a request for scheduling of the communication between the wireless node and the first parent node in the resources; and communicating in the resources with the wireless node based at least in part on the assistance information.

* * * * *